United States Patent
Bunch et al.

(10) Patent No.: US 8,375,144 B2
(45) Date of Patent: Feb. 12, 2013

(54) SYSTEM FOR CONNECTING APPLICATIONS TO LEGACY AND NEXT GENERATION NETWORKS

(75) Inventors: James L. Bunch, Dallas, TX (US);
Craig W. Miller, Dallas, TX (US);
Gerald R. Dubois, Dallas, TX (US);
Lindsey D. Owen, Carrollton, TX (US);
Suryaram Alladi, Plano, TX (US)

(73) Assignee: Metaswitch Networks Ltd, Enfield (GB)

( * ) Notice: Subject to any disclaimer, the term of this patent is extended or adjusted under 35 U.S.C. 154(b) by 140 days.

(21) Appl. No.: 13/069,053

(22) Filed: Mar. 22, 2011

(65) Prior Publication Data
US 2011/0252154 A1 Oct. 13, 2011

Related U.S. Application Data

(60) Provisional application No. 61/316,280, filed on Mar. 22, 2010.

(51) Int. Cl.
*G06F 15/16* (2006.01)
(52) U.S. Cl. .............. 709/246; 709/227; 709/228
(58) Field of Classification Search ............ 709/246, 709/227, 228, 207, 230, 224; 370/338, 352, 370/469; 435/287.2; 455/405
See application file for complete search history.

(56) References Cited

U.S. PATENT DOCUMENTS

| | | | |
|---|---|---|---|
| 2006/0133420 A1* | 6/2006 | Chung et al. | 370/469 |
| 2006/0146786 A1* | 7/2006 | Lian et al. | 370/352 |
| 2007/0173226 A1* | 7/2007 | Cai et al. | 455/405 |
| 2007/0192479 A1* | 8/2007 | Felten | 709/224 |
| 2008/0026453 A1* | 1/2008 | Messenger et al. | 435/287.2 |
| 2010/0098057 A1* | 4/2010 | Stewart | 370/352 |
| 2010/0106846 A1* | 4/2010 | Noldus et al. | 709/229 |
| 2010/0306396 A1* | 12/2010 | Yang et al. | 709/230 |
| 2011/0007735 A1* | 1/2011 | Kruithof | 370/352 |
| 2011/0078274 A1* | 3/2011 | Joachimpillai et al. | 709/207 |
| 2011/0222532 A1* | 9/2011 | Noldus | 370/352 |
| 2012/0099571 A1* | 4/2012 | Staykoff | 370/338 |

* cited by examiner

*Primary Examiner* — Le H Luu
(74) *Attorney, Agent, or Firm* — Baker & Hostetler LLP

(57) ABSTRACT

A system is disclosed. The system includes a first network module communicatively coupled to a plurality of services associated with a first network utilizing a first protocol. The system also includes a second network module communicatively coupled to a plurality of services associated with a second network utilizing a second protocol, the second protocol being different than the first protocol. The system also includes a service determination module coupled to the first and second network modules, the service determination module operable to receive a request from the first network module to access at least one service from the plurality of services associated with the second network. The service determination module determines the at least one requested service and sends the request to the at least one requested service associated with the second network through the second network module utilizing the second protocol.

43 Claims, 11 Drawing Sheets

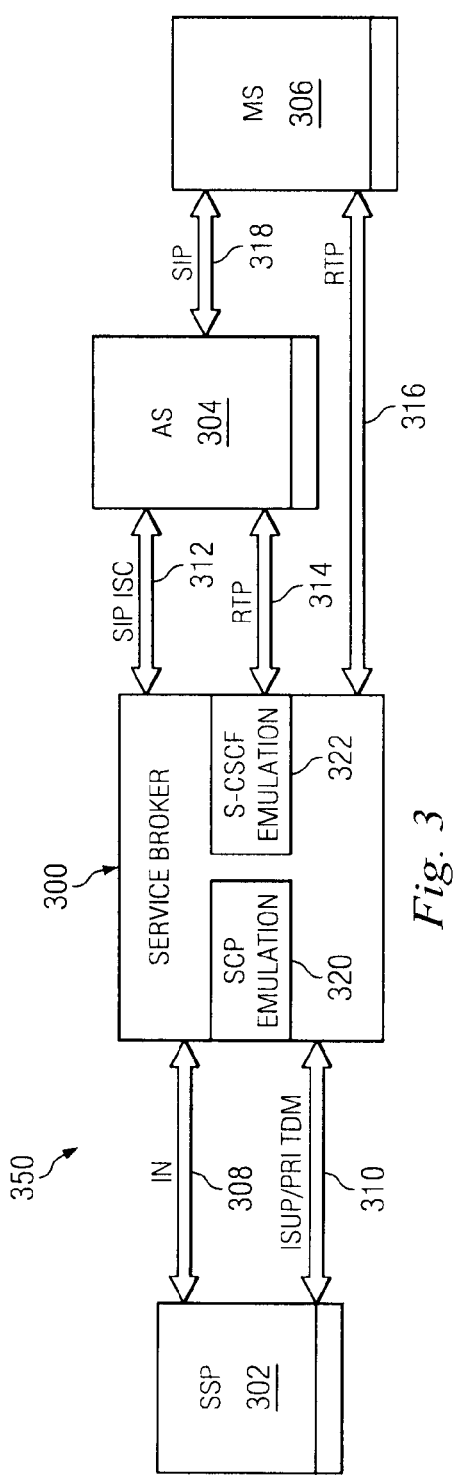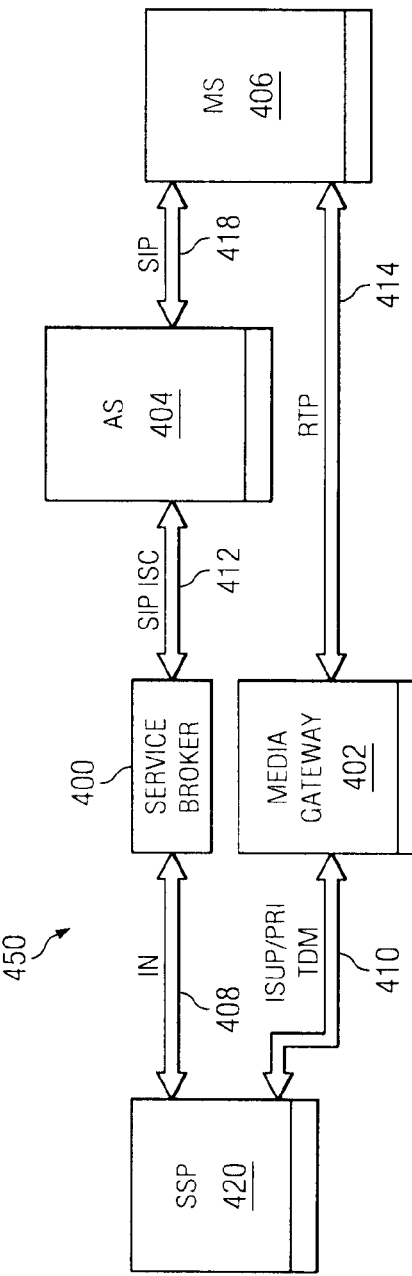
Fig. 3
Fig. 4

SYSTEM FOR CONNECTING APPLICATIONS TO LEGACY AND NEXT GENERATION NETWORKS

RELATED APPLICATION

This application claims the benefit of priority of U.S. Provisional Application No. 61/316,280 Filed Mar. 22, 2010 entitled "Service Broker for Connecting Legacy Applications to Next Generation Networks and Next Generation Applications to Legacy Networks," the disclosure of which is incorporated herein by reference in its entirety.

BACKGROUND

Today, communications service providers have legacy networks deployed that handle voice calls from millions of subscribers and generate the majority of the service providers' revenue. The legacy networks are typically circuit switched telephone networks either for wireline or wireless voice service. The service providers also have legacy applications deployed that connect to their legacy networks and provide revenue generating services to the subscribers. These applications are usually deployed using Intelligent Network (IN) architecture, employing Service Control Point (SCP) systems. Often the SCP relies on Intelligent Peripherals with Service Resource Function (SRF) capability to play tones and announcements, collect dialed digits, provide speech recognition, or convert text to speech when it is required for the application. Examples of legacy voice applications are Freephone, Prepaid Card, Calling Card, Premium Rate, Televoting and many others.

The service providers are also deploying next generation networks that are based on packet switching technology using Internet Protocol (IP) communications. Next generation networks based on IP communications provide the service providers with new, enhanced, multimedia applications that promise to drive new revenue streams. Next generation network architectures such as the IP Multimedia Subsystem (IMS) defined by the 3rd Generation Partnership Project (3GPP) standards body or broadband next generation network (NGN) architectures utilizing softswitch and media gateway standards, utilize Voice-over-IP (VoIP) technology for basic voice service. The service providers are also deploying next generation applications that connect to their next generation networks. These applications are usually deployed in Application Servers (AS), Service Delivery Platforms (SDP) or similar server clustering technologies. Often the AS relies on Media Servers (MS) to play tones and announcements, collect dialed digits, provide speech recognition, or convert text to speech (much like the Intelligent Peripheral for SCPs) when it is required for the application. Examples of next generation voice applications are Unified Messaging, Video Calling, Voice Enabled Web Applications, and many others.

The quandary that the service providers face is how to transition their revenue generating legacy networks to next generation networks. The next generation networks have limited revenue streams today, but promise even greater revenue in the future. The service provider has to build the next generation network as an overlay network alongside the legacy network and operate both networks in parallel. The reason is that it is not realistic for the service provider to build the next generation network, perform a flash cutover of all subscribers to the new network and then decommission the legacy network. As subscribers are migrated to the next generation network they still need access to the legacy voice services. The service provider could replicate all of the legacy voice services using next generation applications, but this approach would be costly and requires that all legacy applications be available on day one on the next generation network. Likewise, deployed next generation applications may be useful for subscribers still using the legacy network.

Therefore, a need exists for communications service providers to reuse legacy applications on next generation networks and use next generation applications on legacy networks. This allows the service providers to easily move subscribers to the next generation network, still offer the same familiar legacy voice applications, and control capital equipment costs for new or ported applications on the next generation network. Furthermore there exists a need to enhance connectivity of applications to networks more generally.

SUMMARY

In one exemplary aspect, the present disclosure is directed to a system. The system comprises a first network module communicatively coupled to a plurality of first applications associated with a first network utilizing a first network protocol. The system also comprises a second network module communicatively coupled to a plurality of second applications associated with a second network utilizing a second network protocol. The second network protocol is different than the first network protocol. A service determination module is coupled to the first and second network modules, the service determination module operable to determine at least one application to be executed for a request. The at least one application is selected from a group including the first applications and the second applications. The service determination module determines the at least one application to execute according to a service determination algorithm. The system also comprises an orchestration module operable to convert at least one first message received by the first network module in the first network protocol into at least one corresponding second message in the second network protocol in order to allow access to the second applications via the first network protocol. The orchestration module is operable to convert at least one second message received by the second network module in the second network protocol into at least one corresponding first message in the first network protocol in order to allow access to the first applications via the second network protocol. The orchestration module is operable to convert messages according to an orchestration scheme. The orchestration scheme is selected according to the first network protocol of the request and the second protocol of the at least one application. The system also comprises a media resource brokering module communicatively coupled to the first and second network modules. The media resource brokering module is operable to determine from the request whether to send a second request to at least one of a plurality of media components to access at least one of media resources associated with the at least one application, the at least one media component being selected according to a media resource brokering algorithm.

In one exemplary aspect, the present disclosure is directed to a system. The system has a first network module communicatively coupled to a plurality of first applications associated with a first network utilizing a first network protocol. The system also has a second network module communicatively coupled to a plurality of second applications associated with a second network utilizing a second network protocol, the second network protocol being different than the first network protocol. The system includes a service determination module coupled to the first and second network modules, the service determination module operable to determine at least one application to be executed for a request, wherein the at least one application is selected from a group including the first applications and the second applications. The system also includes an interworking module operable to convert at least one message received by the first network module in the first network protocol into at least one corresponding message in the second network protocol in order to allow access to the second applications via the first network protocol, the interworking module operable to convert at least one message received by the second network module in the second network protocol into at least one corresponding message in the first network protocol in order to allow access to the first applications via the second network protocol. The system also includes a media resource brokering module communicatively coupled to the service determination module, the media resource brokering module operable to determine from the request whether to send a second request to at least one of a plurality of media components to access at least one media resource associated with the at least one application.

In one exemplary aspect, the present disclosure is directed to a method. The method includes receiving at least one first protocol message indicating a communication from a first network. The method also includes determining, by examining the at least one first protocol message, a first application to be executed for the communication, the application associated with a second network and a second protocol. The method also includes converting the at least one first protocol message into at least one second protocol message. The method also includes sending the at least one second protocol message to the first application via the second network. The method also includes receiving at least one second protocol response message from the first application via the second network. The method also includes determining whether the first application is associated with a media resource. The method also includes in response to determining that the first application requires a media resource, sending a request to at least one media component to access the media resource associated with the first application. The method also includes converting the at least one second protocol response message into at least one corresponding first protocol response message. The method also includes sending the at least one first protocol response message to the first network.

In one exemplary aspect, the present disclosure is directed to apparatus. The apparatus has a first network module suitable for communicatively coupling to a plurality of services associated with a first network utilizing a first network protocol. The apparatus also has a second network module suitable for communicatively coupling to a plurality of services associated with a second network utilizing a second network protocol, the second network protocol being different than the first network protocol. The apparatus also has a service determination module coupled to the first and second network modules, the service determination module operable to receive a signaling request to access at least one service from one of the first or second network module, wherein the service determination module is operable to determine at least one requested service from the request and send the request to the at least one requested service via one of the first or second network modules. The apparatus also includes a media resource module communicatively coupled to the service determination module, the media resource module operable to determine from the request whether to send a second request via one of the first or second network modules to a media component to access media associated with the at least one requested service.

In one exemplary aspect, the present disclosure is directed to a system. The system has a first network module communicatively coupled to a plurality of services associated with a first network utilizing a first network protocol. The system also having a second network module communicatively coupled to a plurality of services associated with a second network utilizing a second network protocol. The second network protocol being different than the first network protocol. The system including a service determination module coupled to the first and second network modules. The service determination module operable to receive a signaling request to access at least one service from the plurality of services associated with the first and second networks. The service determination module determines the at least one requested service from the request and sends the request to the at least one requested service associated with one of the first and second networks. The system having a media resource module communicatively coupled to the service determination module. The media resource module operable to determine from the request whether to send a second request to a media component to access media associated with the at least one requested service.

In one exemplary aspect, the present disclosure is directed to a system. The system has a first network module communicatively coupled to a plurality of services associated with a first network utilizing a first protocol. The system also has a second network module communicatively coupled to a plurality of services associated with a second network utilizing a second protocol. The second protocol being different than the first protocol. The system further includes a service determination module coupled to the first and second network modules. The service determination module operable to receive a request from the first network module to access at least one service from the plurality of services associated with the second network. The service determination module determines the at least one requested service from the plurality of services associated with the second network and sends the request to the at least one requested service associated with the second network through the second network module utilizing the second protocol.

In one exemplary aspect, the present disclosure is directed to a method for use of a service broker positioned between a first network and a second network that includes receiving a request from one of the first and second networks requesting at least one service from a plurality of services associated with one of the first and second networks. The first network utilizing a first protocol and the second network utilizing a second protocol that is different from the first protocol. Also, the method includes determining the at least one requested service from the plurality of services based on the request. Furthermore, the method includes sending the request to the at least one requested service. Additionally, the method includes determining from the request whether the at least one requested service has associated media and sending a second request to at least one of a plurality of media servers associated with one of the first and second networks when the at least one requested service has associated media.

To overcome the issues communications service providers face in offering applications to subscribers on heterogeneous first and second networks, for example legacy and next generation networks, the various Service Broker embodiments of the present invention provide a set of network based functionalities that allow service providers to use first applications, configured to be used on first such networks, on second such networks, and second applications, configured to be used on second such networks, on first networks. The collection of network based functionalities is referred to herein as a Service Broker and the functionalities are summarized in the following paragraphs.

In an embodiment, the Service Broker can provide for interworking next generation network signaling with legacy application level signaling. For example, a next generation network call that needs access to a legacy Freephone application sends a call via SIP signaling to the Service Broker and it in turn interworks the SIP signaling into one of the Intelligent Network protocols used for legacy applications (e.g., AIN, INAP, CAP, WIN, TCAP, or an API).

In an embodiment, the Service Broker can interwork, or map, one or more next generation network signaling protocols such as Session Initiation Protocol (SIP), a SIP variant, H.323, Bearer Independent Call Control (BICC), Media Gateway Control Protocol (MGCP), and Media Gateway Control (Megaco) into one or more Intelligent Network protocols, or legacy network protocols, such as Advanced Intelligent Network (AIN), Intelligent Network Application Part (INAP), Common Alerting Protocol (CAP), Wireless Intelligent Network (WIN), Transaction Capabilities Application Part (TCAP), Mobile Application Part (MAP), and Integrated Serviced Digital Network User Part (ISUP).

In an embodiment, the Service Broker can provide for interworking legacy network signaling with next generation application level signaling. For example, a legacy network call that needs access to a next generation Freephone application sends a call via Intelligent Network signaling to the Service Broker and it in turn interworks the Intelligent Network signaling into SIP signaling used for the next generation application.

In an embodiment, the Service Broker can interwork, or map, one or more Intelligent Network protocols, or legacy network protocols, such as Advanced Intelligent Network (AIN), Intelligent Network Application Part (INAP), Common Alerting Protocol (CAP), Wireless Intelligent Network (WIN), Transaction Capabilities Application Part (TCAP), Mobile Application Part (MAP), and Integrated Serviced Digital Network User Part (ISUP) into one or more next generation network signaling protocols such as Session Initiation Protocol (SIP), a SIP variant, H.323, Bearer Independent Call Control (BICC), Media Gateway Control Protocol (MGCP), and Media Gateway Control (Megaco).

In an embodiment, the Service Broker can provide for interworking legacy network signaling with legacy application level signaling. For example, a legacy network call that needs access to a legacy Freephone application (using a different Intelligent Network signaling protocol) sends a call via Intelligent Network signaling to the Service Broker and it in turn interworks the signaling into a different type of Intelligent Network signaling used for the legacy application.

In an embodiment, the Service Broker can provide for interworking next generation network signaling with next generation application level signaling. For example, a next generation network call that needs access to a next generation Freephone application (using a different variant of SIP signaling) sends a call via SIP signaling to the Service Broker and it in turn interworks the signaling into a different variation of SIP signaling used for the next generation application.

When signaling traffic arrives at the Service Broker from an inbound network the Service Broker can, for example, execute service determination algorithms to determine the type of service that the network is requesting. Service determination can be accomplished by, for example, examination of provisioned information, information in the arriving signaling message, and real time queries to subscriber databases.

In an embodiment, the Service Broker can also provide service determination algorithms for determining that multiple applications may be invoked on a single call. This capability is referred to as multi-application brokering. For example, if a subscriber dials a toll free number (e.g., an 800 number in the United States) and the toll free number is translated to a pilot number that has been ported to another number, then two applications (i.e., Freephone and Local Number Portability) need to be accessed on the same call event.

In an embodiment, the Service Broker can provide for optimal utilization of required media server resources. Many services may require a media path between the subscriber and the application's media resources. For example, the Prepaid Card service requires a media path to the subscriber if the subscriber's prepaid balance is nearing depletion. The Prepaid Card application will detect this condition and barge into the call and play a low balance warning announcement to the prepaid subscriber. Typically, the application uses Intelligent Peripherals or Media Resource Servers to provide the media for the announcement. The Service Broker provides methods for signaling interworking, routing and load sharing, resource management, overload controls, and fault detection for optimal control of media resources.

In an embodiment, the Service Broker can provide embedded voice services for use with next generation networks only requiring provisioning to activate. For example, the Service Broker supports Televoting service interworking that can be enabled by provisioning the service. No programming changes are required to make the Televoting service functional.

In an embodiment, the Service Broker can provide for creating and modifying service interworking logic by a third party. As previously mentioned, the Service Broker can provide full support for voice services. Often service providers create special features to differentiate themselves from other service providers. For example, a service provider might desire to offer a Freephone service that plays an announcement while the call is being routed to the final destination but this capability is not part of the embedded service interworking logic for Freephone service. The Service Broker can provide a toolkit that allows the service provider and/or other third party to modify the service interworking logic to play the announcement. This can be accomplished with an XML based programming language that does not require the traditional programming steps of compiling and linking. Thus the third party can modify and test the logic in their own test lab and then deploy the service in the field without software changes from the equipment manufacturer.

To effectively provide connectivity of legacy applications to next generation networks and connectivity of next generation applications to legacy networks, the various embodiments of the Service Broker can provide all or some of the capabilities described herein.

Provided is a Service Broker that performs a network based software function. The Service Broker software may be deployed as a standalone core network element or deployed in an existing core network element such as a Signal Transfer Point (STP), Serving Call Session Control Function (S-CSCF), SIP Signaling Router (SSR), Softswitch, Session Border Controller (SBC) or other core network element.

The Service Broker provides a unique set of useful features. These features may include, but are not limited to:
1) Interworking of legacy and next generation signaling protocols;
2) Service interaction capabilities for calls that require access to multiple applications or networks;

3) Resource management services for calls that require special media;
4) Embedded service interworking logic for voice services;
5) Service creation tools that facilitate application/service development and connectivity.

To effectively provide enhanced connectivity of applications networks, the Service Broker provides all or some of the capabilities described herein.

BRIEF DESCRIPTION OF THE DRAWINGS

Aspects of the present disclosure are best understood from the following detailed description when read with the accompanying figures.

FIG. 3 shows another embodiment of a system in which a Service Broker provides access to a next generation application for subscribers on a legacy network according to various aspects of the present disclosure.

FIG. 4 shows another embodiment of a system in which a Service Broker supports a configuration where the media flows through an external media gateway according to various aspects of the present disclosure.

DETAILED DESCRIPTION

Figure 1:
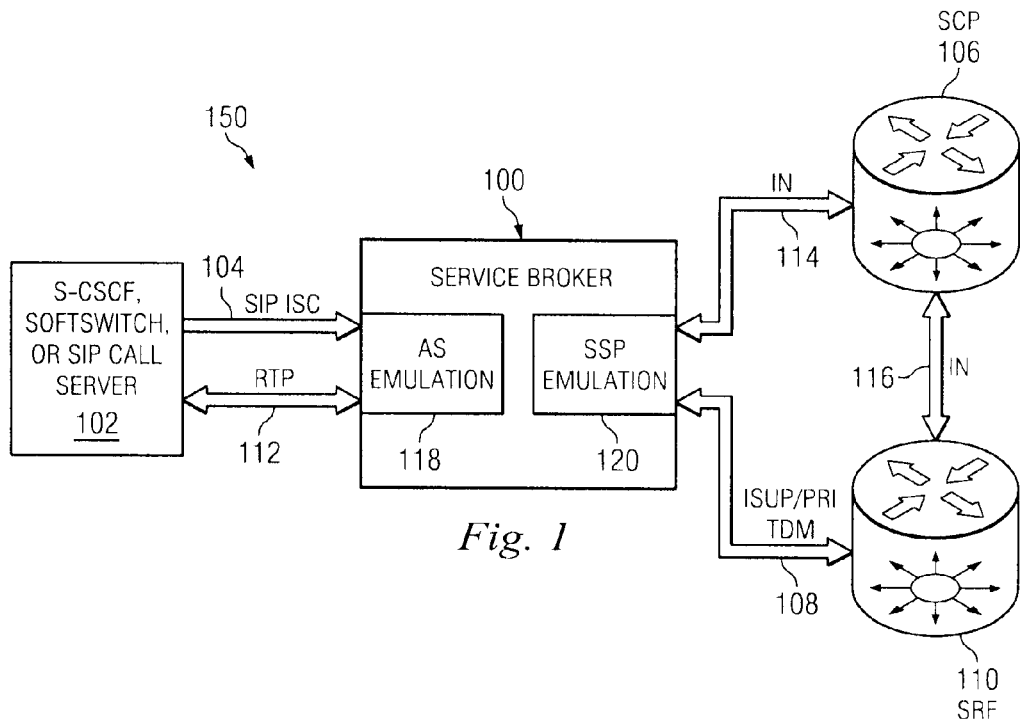
FIG. 1 shows one embodiment of a system in which a Service Broker provides access to an Intelligent Network application for subscribers on a next generation network according to various aspects of the present disclosure.

It is understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 shows one embodiment of a system 150 in which a Service Broker 100 provides access to an Intelligent Network application for subscribers on a next generation network according to various aspects of the present disclosure. The Service Broker 100 can be deployed in multiple network configurations and provides emulation of multiple network entities. The Service Broker 100 has the ability to emulate legacy (SSP, SCP, and IP) and next generation (AS, MRB, and MS) network elements, allowing it to easily broker signaling between the network and the application.

The call signaling device 102 in the next generation network (e.g., a softswitch, S-CSCF, or other SIP-based call server) determines that a particular call needs to access a network based application and launches a call by sending call signaling messages 104 using a next generation signaling protocol (for example, SIP) to the Service Broker 100 to get access to that application. The Service Broker 100 converts the SIP call signaling messages 104 into the appropriate Intelligent Network signaling protocol messages 114 and forwards them to the SCP 106. The Service Broker 100 provides an equivalent capability in the reverse direction; it converts Intelligent Network signaling messages 114 from the SCP 106 into SIP signaling messages 104 and forwards them to the next generation network call signaling device. If the SCP based application also requires media then the Service Broker 100 sets up a circuit switched call 108 (e.g., an ISDN/PRI TDM call) to the SRF 110 and converts the packet based media from the next generation network to circuit switched media towards the SRF 110. In this scenario the Service Broker 100 is emulating an Application Server on the network side and emulating a Service Switching Point (SSP) on the application side, as illustrated by the AS Emulation module 118 and the SSP Emulation module 120. The SCP 106 and the SRF 110 also send Intelligent Network signaling messages 116 to one another in such a scenario. The SCP 106 and SRF 110 are depicted as cylinders containing arrows representing message passing/routing functionality. This symbol is repeated throughout the figures of the present disclosure and is intended to have the same meaning throughout.

Although the above embodiment is described using SIP for the next generation signaling, other embodiments use other next generation protocols, for example H.323, Diameter, and BICC. In addition, other embodiments employ one or more of the many variants of the SIP protocol. These variants include, but are not limited to, vendor-specific variants, application-specific variants, and country or region-specific variants.

Figure 2:
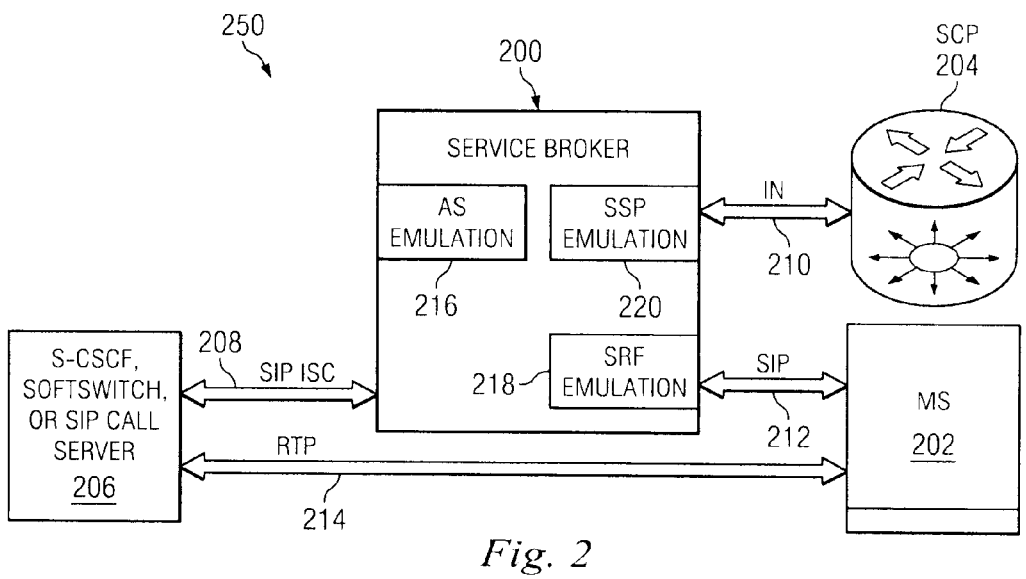
FIG. 2 shows another embodiment of a system in which a Service Broker provides access to an Intelligent Network application for subscribers on a next generation network where the Intelligent Network application obtains media from a media server according to various aspects of the present disclosure.

FIG. 2 depicts another embodiment of a system 250 in which a Service Broker 200 provides access to an Intelligent Network application for subscribers on a next generation network according to an embodiment of the present disclosure. In the depicted embodiment, the Intelligent Network application obtains media (in the form of RTP stream 214) from a Media Server 202. The system 250 of FIG. 2 is a similar configuration to the system 150 of FIG. 1, except the SRF 110 has been replaced by the Media Server 202. This configuration may be referred to as SRF emulation and is useful when the service provider wants to keep the legacy based SCP application deployed but wants to decommission the legacy SRF and replace it with next generation Media Servers. This emulation is performed by an SRF emulation module 218. The Service Broker 200 converts the SIP call signaling messages 208 into the appropriate Intelligent Network signaling protocol messages 210 and forwards them to the SCP 204. If the SCP 204 based application also requires media then the Service Broker 200 provides a media server network address in the SIP signaling 208 so that the SIP Call Server 206 can direct the media to flow directly from the SIP Call Server 206 to the Media Server 202. The Service Broker 200 also sends the appropriate SIP signaling 212 to the Media Server 202 to allow the SIP Call Server 206 access to the desired media, which is then sent to the SIP Call Server as RTP stream 214.

FIG. 3 depicts another embodiment of a system 350 in which a Service Broker 300 provides access to a next generation application for subscribers on a legacy network according to various aspects of the present disclosure. The call signaling device 302 in the legacy network (e.g., a Class 5, Class 4, or Mobile Switching Center (MSC) with SSP capability) determines that a particular call needs to access a network based application. The call signaling device 302 then launches a call by sending signaling messages 308 according to a legacy signaling protocol (typically, Intelligent Network signaling) to the Service Broker 300 to get access to that application. The Service Broker 300 converts the Intelligent Network call signaling messages 308 into the appropriate next generation signaling protocol messages 312 (typically SIP or Diameter) and forwards them to the Application Server 304. The Service Broker 300 provides an equivalent capability in the reverse direction; it converts next generation network signaling messages 314 from the Application Server 304 into Intelligent Network signaling messages 308 and forwards them to the legacy network call signaling device 302. If the Application Server 304 based application also requires media then the Service Broker 300 will receive a circuit switched call 310 from the call signaling device 302 and in turn it sets up a packet switched call to the Media Server 306 and converts the circuit switched based media from the call 310 from the legacy network to packet switched media 316 (e.g., an RTP stream) towards the Media Server 306. The Service Broker 300 also performs this media conversion in the opposite direction, converting packet switched media 316 into circuit based media for the call 310. In this configuration, the Application Server 304 interacts with the Media Server 306 via next generation protocol messages 318 (typically SIP or Diameter) in order to negotiate the media settings between the Media Server 306 and the Service Broker 300. In this scenario, the Service Broker 300 is emulating an SCP on the network side and emulating a SIP call server, Softswitch, or S-CSCF on the application side. The Service Broker 300 performs this emulation via SCP and S-CSCF emulation modules 320 and 322.

FIG. 4 depicts another embodiment of a system 450 including a Service Broker 400 supporting a configuration where the media flows through an external media gateway 402 according to various aspects of the present disclosure. FIG. 4 depicts the Service Broker 400 in a similar network configuration as FIG. 3 except that the media flows through the external Media Gateway 402. In the depicted embodiment, the call signaling device 420 launches a call by sending legacy signaling messages 408 (for example, Intelligent Network signaling) to the Service Broker 300 to get access to that application. The Service Broker 400 converts the Intelligent Network call signaling messages 408 into the appropriate next generation signaling protocol messages 412 (typically SIP or Diameter) and forwards them to the Application Server 404. The Service Broker 400 provides an equivalent capability in the reverse direction; it converts next generation network signaling messages 412 from the Application Server 404 into Intelligent Network signaling messages 408 and forwards them to the legacy network call signaling device 420. If the Application Server 404 based application also requires media then the Service Broker 400 will receive a circuit switched call 410 from the call signaling device 402 and in turn it sets up a packet switched call to the Media Server 406. The Media Gateway 402 then converts the circuit switched based media from the call 410 from the legacy network to packet switched media 414 (e.g., an RTP stream) towards the Media Server 406. The Media Gateway 402 also performs this media conversion in the opposite direction, converting packet switched media 414 into circuit based media for the call 410. In this configuration, the Application Server 404 interacts with the Media Server 406 via next generation protocol messages 418 (typically SIP or Diameter) in order to negotiate the media settings between the Media Server 406 and the Media Gateway 402.

Figure 5:
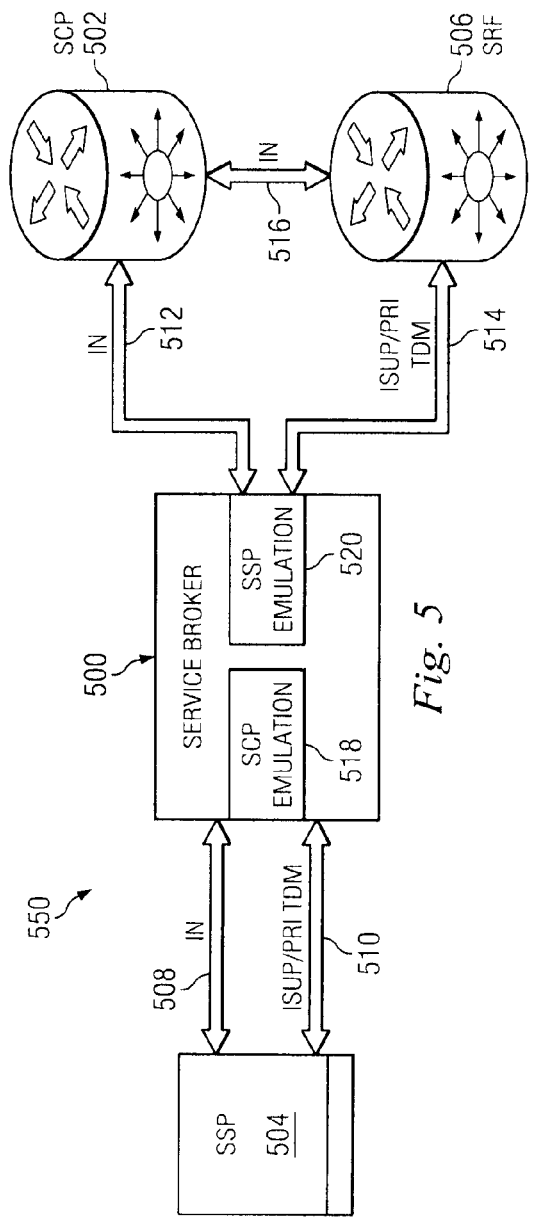
FIG. 5 shows another embodiment of a system in which a Service Broker provides access to a legacy application for subscribers on a legacy network according to various aspects of the present disclosure.

FIG. 5 shows another embodiment of a system 550 according to various aspects of the present disclosure. In the depicted embodiment, Service Broker 500 provides access to a legacy application for subscribers on a legacy network. This configuration allows service providers to connect SCPs 502 based on one Intelligent Network standard to SSPs 504 based on a different Intelligent Network standard. The Service Broker 500 does this by converting the first Intelligent Network protocol messages 508 into corresponding second Intelligent Network protocol messages 512. For example, a service provider may have a prepaid service that utilizes the CAMEL Intelligent Network protocol and the SSPs utilize the INAP Intelligent Network standard. The Service Broker then converts the INAP signaling to CAMEL signaling and vice versus. Additionally it allows service providers to connect SSPs to SCPs that are based on the same Intelligent Network standard but each is based on a different vendor or country variant of that particular Intelligent Network standard. In this scenario, the Service Broker 500 is emulating an SCP on the network side and emulating a SSP on the application side.

This emulation is performed by SCP Emulation module 518 and SSP Emulation module 520 of the Service Broker 500. The Service Provider 500 also performs the function of terminating circuit switched call 510, and originating an additional circuit switched call 514 to SRF 506. In the depicted configuration, the SCP 502 and SRF 506 communicate via Intelligent Network protocol messages 516.

Figure 6:
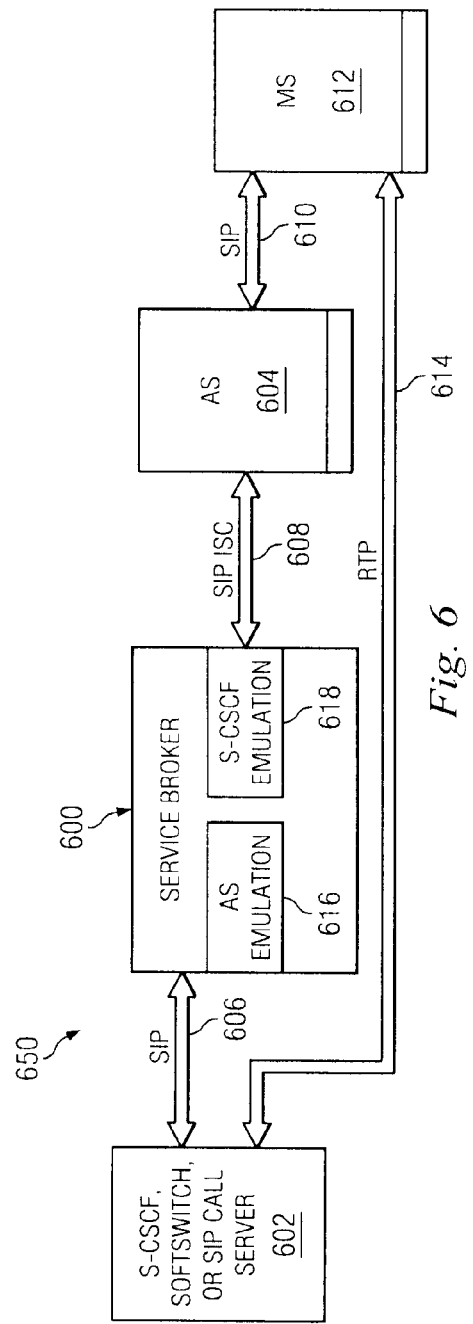
FIG. 6 shows another embodiment of a system in which a Service Broker provides access to a next generation application for subscribers on a next generation network according to various aspects of the present disclosure.

FIG. 6 depicts another embodiment of a system 650 according to various aspects of the present disclosure. The system 650 includes Service Broker 600, which provides access to a next generation application for subscribers on a next generation network. This configuration is required when different versions or variants of SIP signaling are used by the SIP Call Server 602 and the Application Server 604. The call signaling device (e.g. SIP Call Server 602) in the next generation network (e.g., a softswitch, S-CSCF, or other SIP based call server) determines that a particular call needs to access a network based application and it launches a call by sending next generation signaling protocol messages 606 (typically, SIP) to the Service Broker 600 to get access to that application. The Service Broker 600 converts the SIP call signaling messages 606 into the appropriate variant SIP signaling protocol messages 608 and forwards them to the Application Server 604. The Service Broker 600 provides an equivalent capability in the reverse direction; it converts SIP signaling messages 608 from the Application Server 604 into the appropriate variant SIP signaling messages 606 and forwards them to the next generation network call signaling device (e.g. SIP Call Server 602). The Application Server 604 also sends SIP signaling protocol messages 610 to the Media Server 612 to negotiate media settings between the SIP Call Server 602 and the Media Server 612. Accordingly, a two-way media stream (e.g., RTP stream 614) is sent between Media Server 612 and SIP Call Server 602. In this scenario, the Service Broker 600 is emulating an Application Server on the network side and emulating an S-CSCF on the application side. This emulation is performed by the Application Server Emulation module 616 and the S-CSCF Emulation module 618 of the Service Broker 600, respectively.

Figure 7:
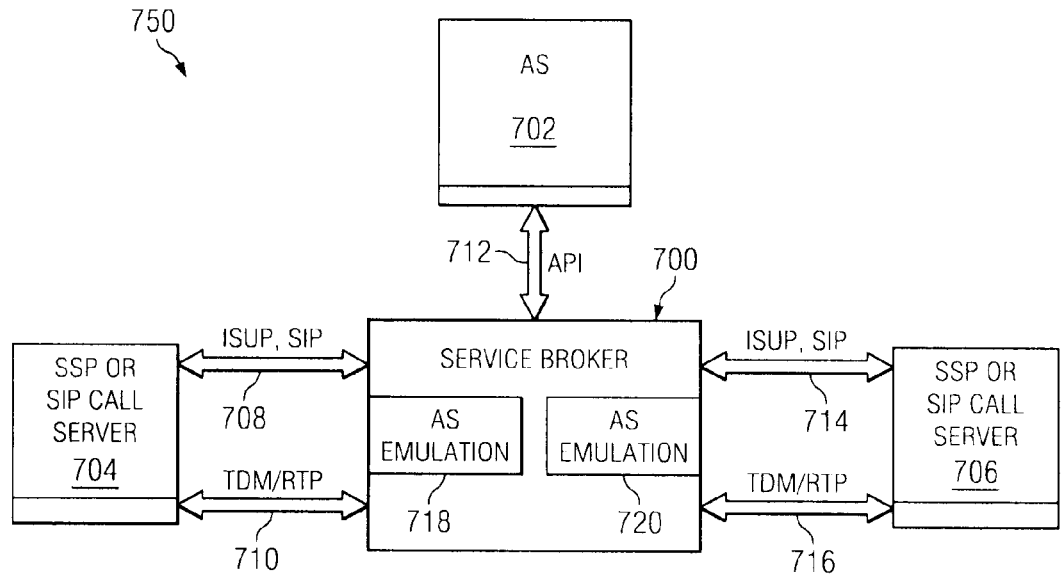
FIG. 7 shows another embodiment of a system in which a Service Broker provides access to a next generation Application Server for subscribers on a legacy network or a next generation network according to various aspects of the present disclosure.

FIG. 7 depicts another embodiment of a system 750 according to various aspects of the present disclosure. The system 750 includes a Service Broker 700 providing access to a next generation Application Server 702 for subscribers on a legacy network or a next generation network according to an embodiment of the present disclosure. The call signaling device 704 in the next generation network (e.g., a softswitch, S-CSCF, or other SIP based call server) determines that a particular call needs to access a network based application and it launches a call by sending the appropriate messages 708 according to a next generation signaling protocol (typically, SIP) to the Service Broker 700 to get access to that application. The Service Broker 700 converts the SIP call signaling messages 708 into the appropriate API indications 712 to the Application Server 702. The Service Broker 700 provides an equivalent capability in the reverse direction; it converts API calls 712 from the Application Server 702 into SIP signaling messages 708 and forwards them to the next generation network call signaling device 704. If the Application Server based application also requires media or call termination to another network switching system then the Application Server 702 sets up the call using API calls 712 to the Service Broker 700. The Application Server 702 then sends the appropriate SIP signaling messages to a network call signaling device 706 in the other network. In addition to signaling in both directions, the Service Broker will also receive and replicate or convert media streams 710 and 716 from the two networks. For legacy networks, the scenario is the same except legacy signaling protocols (e.g., ISUP/PRI) and media formats (e.g., TDM) are used. In this scenario, the Service Broker 700 is emulating an Application Server on the network side and emulating another Application Server on the other network side. This emulation is performed by two Application Server Emulation modules 718 and 720.

Generally, the Service Broker provides a flexible software platform that allows it to support multiple network configurations and emulate multiple network elements. The flexibility is provided by, at least in part, support for the following capabilities: (1) Legacy signaling protocols (e.g., ISUP, PRI ISDN, etc.); (2) Next generation signaling protocols (e.g., SIP, H.323, BICC, etc.); (3) Independently provision connected network elements with interface and signaling parameters; (4) Emulation logic for legacy network elements (e.g., SSP, SCP, SRF, etc.); and/or (5) Emulation logic for next Generation network elements (e.g., AS, MS, etc.).

The Service Broker also can support simultaneous connectivity to multiple applications and multiple networks. This capability provides the service provider a flexible solution for connecting one or more applications to their legacy and next generation networks. Service Brokers can be deployed as a dedicated network element for a single service or as a dedicated network element provided brokering functions for multiple applications.

Figure 8:
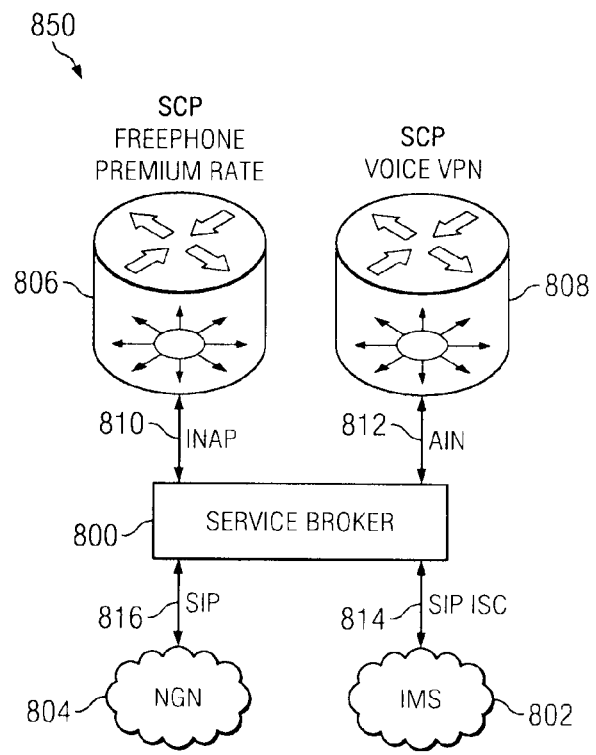
FIG. 8 shows another embodiment of a system in which a Service Broker is connected to two applications and two networks according to various aspects of the present disclosure.

Referring now to FIG. 8, a system 850 is shown according to various aspects of the present disclosure. The system 850 includes a Service Broker 800 connected to two applications and two networks. On the southbound side (southbound refers to the trigger/control messaging to/from the switching systems), the Service Broker 800 is connected to an IMS network 802 using SIP ISC signaling 814 and to a softswitch based next generation network 804 using SIP signaling 816. On the northbound side (northbound refers to the application interface—either an SCP or Application Server), the Service Broker 800 is connected to an SCP 806 providing Freephone and Premium Rate service and another SCP 808 providing Voice VPN service. The signaling to the SCPs can be any of the Intelligent Network protocols 810, 812. This network configuration allows subscribers on the southbound next generation networks to access Freephone, Premium Rate, and Voice VPN services that are still deployed on SCPs in the legacy network.

Figure 9:
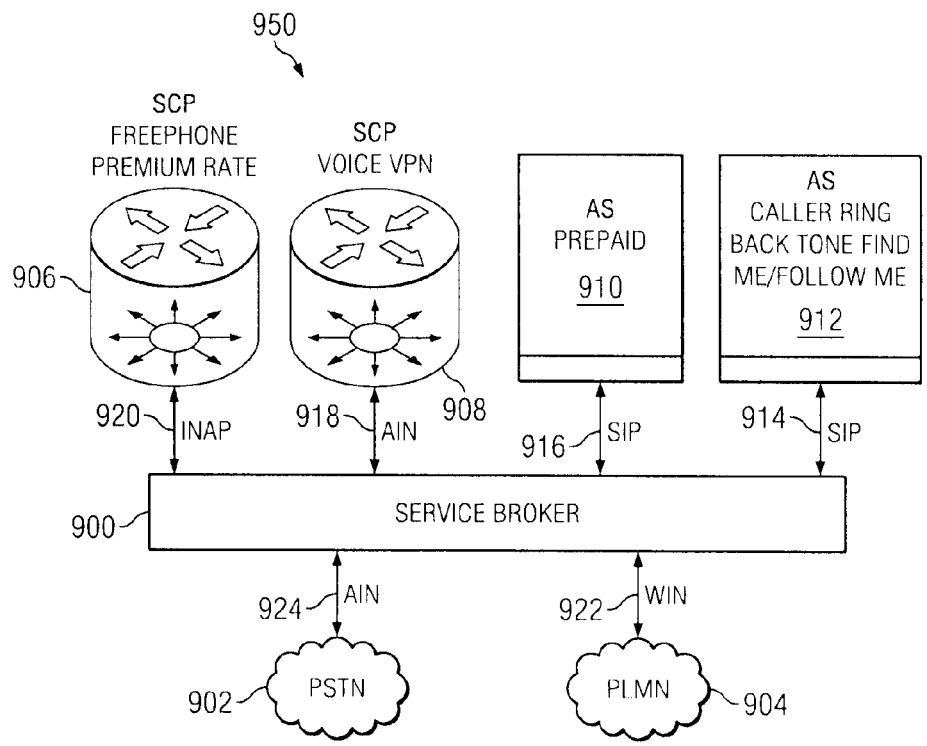
FIG. 9 shows another embodiment of a system in which a Service Broker is connected to four applications and two networks according to various aspects of the present disclosure. On the southbound side the Service Broker is connected to the Public Switch Telephone Network (PSTN) for wireline subscribers and connected to the Public Land Mobile Network (PLMN) for wireless subscribers.

FIG. 9 depicts a system 950 including a Service Broker 900 connected to four applications and two networks. On the southbound side, the Service Broker 900 is connected to the Public Switch Telephone Network (PSTN) 902 for wireline subscribers and connected to the Public Land Mobile Network (PLMN) 904 for wireless subscribers. On the southbound side, the wireline and wireless networks use Intelligent Network signaling (e.g. AIN messages 924, WIN messages 922) to communicate with the Service Broker 900. On the northbound side, the Service Broker 900 is connected to next generation application servers via SIP signaling or SCPs utilizing Intelligent Network signaling. This network configuration allows subscribers on the southbound legacy networks to access Freephone/Premium Rate 906, Voice VPN 908, Prepaid 910, Color Ring Back Tone and/or Find Me/Follow Me 912 services that are deployed on legacy SCPs or next generation Application Servers. These services communicate to the service broker using various legacy and next generation protocols, including, for example, SIP (messages 914, 916), AIN (messages 918), and INAP (messages 920).

In summary, the Service Broker supports any combination of next generation or legacy networks on the southbound side and any combination of legacy SCP or next generation Application Servers on the northbound side. The examples discussed herein are for exemplary purposes only and are not to be construed as a limitation to any combination of next generation or legacy networks on the southbound side and any combination of legacy SCP or next generation Application Servers on the northbound side in which the Service Broker supports.

The Service Brokers, disclosed herein, provide the capability to access multiple applications for a single call. This capability is referred to by several terms; service brokering, service mediation, or service interaction. The key capabilities that make this possible are described in the following paragraphs.

When a call arrives at the Service Broker the system must determine what service is being requested. This capability is referred to as service determination. The Service Broker must support several methods for determining the service being offered which are described below.

For services offered to the Service Broker from next generation networks based on SIP signaling, the following service determination methods can be provided by the Service Broker: (1) The next generation network can use a dedicated SIP user agent for a particular service which can be provisioned on the Service Broker. All calls arriving at the Service Broker that are addressed to the dedicated SIP user agent are routed to a particular service; (2) The next generation network can encode the Request URI in the INVITE message with a Distinctive URI that identifies the service. For example, the following Request URI indicates that Freephone service is being requested: INVITE sip:8002039999@Freephone:5060 SIP/2.0. The Service Broker allows the string "Freephone" to be provisioned in its Freephone service database and if it matches the string in the Distinctive URI then the services is determined to be Freephone; (3) The next generation network can include the P-Asserted-Service header in the INVITE message that identifies the service. For example, the following P-Asserted-Service header indicates that Freephone service is being requested: P-Asserted-Service: urn:urn-123:3gpp-service.ims.icsi.freephone. The Service Broker allows the string "urn:urn-123:3gpp-service.ims.icsi.freephone" to be provisioned in its Freephone service database and if it matches the string in the P-Asserted-Service header then the service is determined to be Freephone; (4) The next generation network can include the P-Service-Indication header in the INVITE message that identifies the service. For example, the following P-Service-Indication header indicates that Freephone service is being requested: P-Service-Indication: Freephone. The Service Broker allows the string "Freephone" to be provisioned in its Freephone service database and if it matches the string in the P-Service-Indication header then the service is determined to be Freephone; and/or (5) The next generation network may not be able to determine the requested service before it forwards the call to the Service Broker so it cannot format SIP headers that identify the service. For this case the Service Broker inspects the dialed digits in the called party address (or other information in the initial signaling message) to determine the service. For example, in the United States the following dialed digits indicate that Freephone service is being requested: "800". The Service Broker allows the string "800" to be provisioned in its Freephone service database and if it matches the string in the called party of the to: header in the INVITE message then the service is determined to be Freephone.

For services that offered to the Service Broker from legacy networks based on Intelligent Network signaling the following service determination methods are provided by the Service Broker: (1) The legacy Intelligent Network can use a dedicated Subsystem Number for a particular service which can be provisioned on the Service Broker. All calls arriving at the Service Broker that are addressed to the dedicated Subsystem Number are routed to a particular service; (2) The legacy Intelligent Network can use a dedicated Service Key for a particular service which can be provisioned on the Service Broker. All calls arriving at the Service Broker that are addressed to the dedicated Service Key are routed to a particular service; and/or (3) The legacy Intelligent Network may not be able to determine the requested service before it forwards the call to the Service Broker it cannot format a Subsystem Number or Service Key that identifies the service. For this case the Service Broker inspects the dialed digits in the called party address (or other information in the initial signaling message) to determine the service. For example, in the United States the following dialed digits indicate that Freephone service is being requested: "800". The Service Broker allows the string "800" to be provisioned in its Freephone service database and if it matches the digits in the called party of the initial Intelligent Network message then the service is determined to be Freephone.

The Service Broker can be provisioned to support a particular service before it activates that service based on the service determination criteria. For example, if the Service Broker is not provisioned for 800 services and it receives an 800 call it may be unable activate the 800 service interworking logic.

The Service Broker provides the capability to invoke multiple applications for a single call. The applications can be invoked in the following manner: (1) Dynamic serial invocation—upon receiving a call arrival the Service Broker performs service determination and invokes the correct application. When that application responds to the initial request the Service Broker performs service determination again to see if another application needs to be invoked based on the response from the first application; (2) Static serial invocation—upon receiving a call arrival the Service Broker performs service determination and receives a list of applications to invoke for this call. When the first application in the list responds to the initial request the Service Broker then invokes the next application in the list. This process continues until the last application has been invoked. Parallel invocation—upon receiving a call arrival the Service Broker performs service determination and receives a list of applications to invoke simultaneously or in parallel for this call.

The Service Broker provides two methods for handling the responses from applications invoked in parallel: (1) The Service Broker waits for the response from all of the applications before continuing the call, and/or (2) the Service Broker continues the call after receiving a response from at least one application and then cancels the queries to the other applications.

The Service Broker provides the capability to associate a set of provisioned endpoints to a Service Interworking Component. In this manner all traffic using those endpoints will be sent to the correct service. For circuit switched calls the provisioned endpoints might be a pool (or trunk group) of circuits. Any call arriving on one of those circuits will be directed to the service associated with that circuit. Likewise for SIP traffic, messages arriving at a particular 'User Agent' (IP address and port) can be easily associated with the correct service interworking logic.

Typically, for Intelligent Network traffic there are no circuits to easily associate with a service. In this case a remote Intelligent Network element could be associated with a service. Any signaling to or from this remote Intelligent Network element would be directed to a particular service.

The Service Broker provides the capability to route to a particular service based on information in the received signaling messages. This capability is similar to traditional circuit switched routing methods.

When an incoming origination message arrives, a translation table is used to match this origination message. Which translation table is searched is provisioned against the pool or remote Intelligent Network node the call is associated with. The translation table contains a number of entries. Each entry contains a field which defines which signaling information element (i.e. called party, calling party, etc) to attempt to match. The translation table entry also contains a field which references another table called the route table. The route table also contains multiple entries, with each entry storing a different set of digits or characters to match. The route table can contain entries with overlapping specificity of digits to match. But the routing software always matches the most specific entry. If, for example, one entry contained '800' and another entry contained '800-555', an arriving call to '800-555' would match the '800-555' entry, not just '800'.

When the content of an arriving message matches the content of the specified signaling information element, another field in the route table indicates the action to take. The action generally points to another table (a route list) which contains information on how to route to the service to use. But, for more flexibility, the action could point to another translation table entry which could then be used to match against other signaling information elements to further discriminate a service application. In this way multiple signaling information elements could be used for service determination.

The Service Broker also provides rules based capabilities for determining the service to invoke.

For each service interworking function available on a service broker, a Service Logic Component (SLC) is required. The SLC represents that service interworking function, and contains the provisioning information needed for that service. At any given time, there are potentially many SLC's provisioned on a Service Broker, but only one, for example, may be chosen to handle any given originating message.

Part of the provisioning of the SLC, is to specify rules that that service interworking should use for screening origination messages. Similar to the 'route list' based service determination, these rules match values of signaling information elements in the arriving messages, with values provisioned against each SLC.

The SLCs are ordered in a priority order, where the first SLC in the list is evaluated first, followed by the second, and so on. A 'default' SLC exists to match any originating message that doesn't match any of the proceeding SLCs.

A rule to match an incoming message consists of defining the signaling information element to be matched, and the desired value. The comparisons to be performed are based on the data type of particular signaling information element. Numeric data types can be compared using operators like 'equal to', 'less than', or 'greater than'. String types can be compared using regular expressions. Other types may have other methods of evaluation.

Rules can also be combined in combinatorial expressions. This provides a lot of flexibility in specifying exactly which originating message goes to which service.

The advantage of the rules based approach, over the previously described methods is the added flexibility. The rules based approach gives access to more signaling information elements, and adds the ability to create rules based on logical combinations of values. The approach specified in the 'Route List' based approach only allows the equivalent of 'AND' combinations by cascading multiple translation table entries. Another advantage over the 'Route List' based approach, is that with the 'rules based' approach, all of the logic is specified in one logic rule, rather than having to traverse multiple table entries to understand what messages go to a particular service.

The Service Broker provides the capability to interwork next generation network signaling protocols with legacy network signaling protocols. The Service Broker provides this capability by converting the incoming message(s) to the appropriate outgoing message(s) and by converting incoming message parameter(s) to the appropriate outgoing message parameter(s). The Service Broker has built in service logic that often receives multiple incoming messages that result in a single outgoing message so the message mapping is not a simple and straight forward one-to-one mapping. The Service Broker also has built in service logic that knows when to map incoming message parameters to outgoing message parameters, when to populate outgoing parameters with Service Broker provisioned data, when to query an external database system for parameter values, and when to populate other parameters with hard coded values.

The Service Broker supports several methods for signaling interworking and several examples are described herein.

When a next generation network needs to access a legacy application the communication involves interworking of SIP signaling with Intelligent Network signaling. The Service Broker maps individual SIP messages from the next generation network into the appropriate Intelligent Network protocol message and forwards that message to the SCP. Additionally, the Service Broker maps individual SIP headers and header parameters into the appropriate Intelligent Network information elements carried by the appropriate Intelligent Network protocol message.

Figure 10:
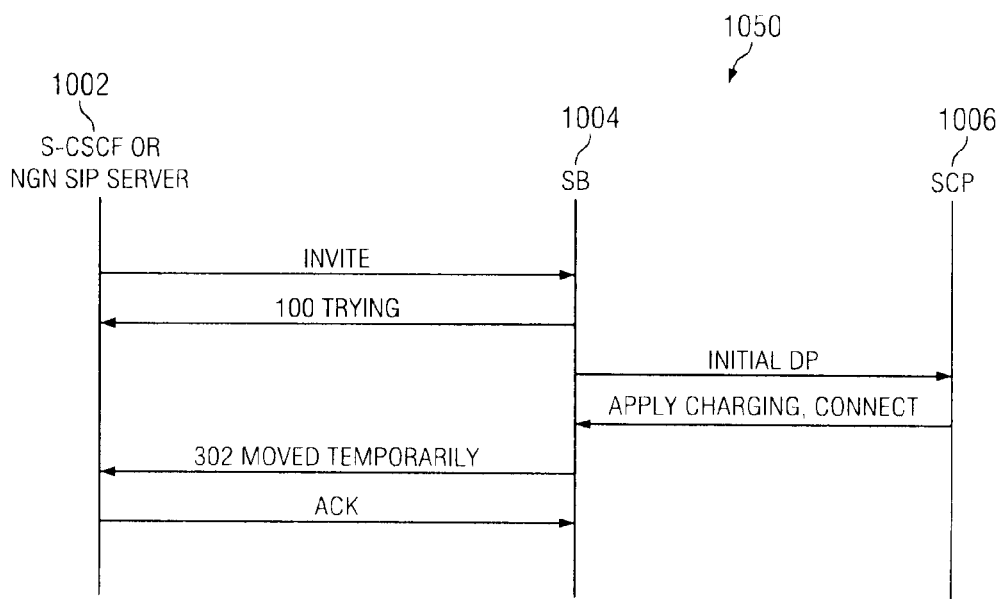
FIG. 10 shows an exemplary message sequence diagram of a SIP to Intelligent Network interworking call flow according to various aspects of the present disclosure.

FIG. 10 shows an exemplary message sequence diagram 1050 of a SIP to Intelligent Network interworking call flow according to various aspects of the present disclosure. In this example, the Service Broker 1004 maps the received SIP Invite message from the S-CSCF or NGN SIP Server 1002 into an Intelligent Network Application Part (INAP) Initial Detection Point message, which it then sends to the SCP 1006. The called number in the Request URI of the SIP Invite is mapped into the Called Party Number of the Initial Detection Point message. Other parameters in the SIP Invite such as the Calling Party Number in the From: header or the Bearer Capability from the Session Description Protocol (SDP) portion of the incoming message are also mapped into corresponding fields in the Initial Detection Point message. Some message Initial Detection Point parameters such as the Service Key or Subsystem Number are populated using Service Broker provisioned data instead of using information or parameters from the SIP Invite. When the Service Broker 1004 receives the Connect message from the SCP 1006 the Redirection Number is copied to the Contact header of the 302 Moved Temporarily message. The Service Broker 1004 also copies the charging information from the Apply Charging message to the 302 Moved Temporarily message so the receiving S-CSCF or NGN SIP Server 1002 can determine which party to charge. Additionally, the Billing Characteristics information is copied in to the P-Charge-Info header for processing by the S-CSCF or NGN SIP Server 1002.

When a legacy network needs to access a next generation application the communication involves interworking of Intelligent Network signaling with SIP signaling. The Service Broker maps individual Intelligent Network messages from the legacy network into the appropriate SIP protocol message and forwards that message to the Application Server. Additionally, the Service Broker maps individual Intelligent Network information elements into the appropriate SIP headers and header parameters carried by the appropriate SIP protocol message.

Figure 11:
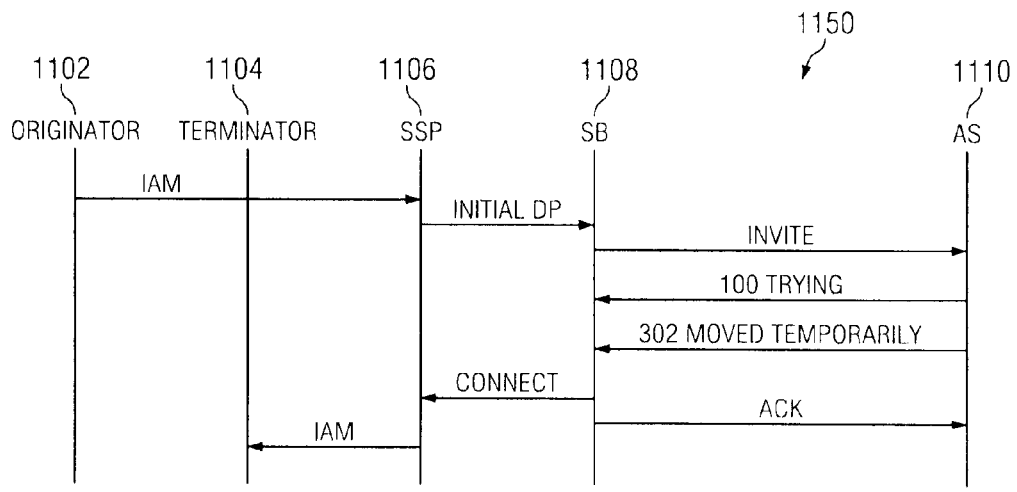
FIG. 11 shows an exemplary message sequence diagram of an Intelligent Network to SIP interworking call flow according to various aspects of the present disclosure.

FIG. 11 shows an exemplary message sequence diagram 1150 of an Intelligent Network to SIP interworking call flow according to various aspects of the present disclosure. In this example, an Originator 1102 sends an Initial Address Message (IAM) to an SSP 1106. The SSP 1106 sends an INAP Initial Detection Point message to the Service Broker 1108. The Service Broker 1108 maps the received INAP Initial Detection Point message into a SIP Invite message that it sends to an Application Server 1110. The called number of the Initial Detection Point is mapped into the Request URI of the SIP Invite message. Other parameters in the Initial Detection Point message such as the Calling Party Number or the Bearer Capability are also mapped into corresponding fields in the SIP Invite message. Some message parameters such as P-Asserted-Service header are populated using Service Broker provisioned data instead of using information or parameters from the Initial Detection Point. When the Service Broker 1108 receives the 302 Moved Temporarily message the Redirection Number in the Contact header is copied to the Destination Routing address parameter of the Connect message, which it sends to the SSP 1106. The SSP 1106 in turn converts the Connect message to an Initial Address Message (IAM) and sends it to a Terminator 1104.

When a next generation network needs to access a next generation application the communication typically involves direct SIP signaling between the two network elements. However, since there are many vendor and country specific variants of SIP emerging; often the next generation network and the next generation application cannot communicate due to SIP protocol incompatibilities. The Service Broker solves this problem by providing the capability to interwork between different variants of SIP signaling. This is accomplished by adding and deleting SIP headers and parameters on each SIP call leg based on provisioning or custom XML scripts invoked for each SIP message that manipulate the headers and parameters.

Figure 12:
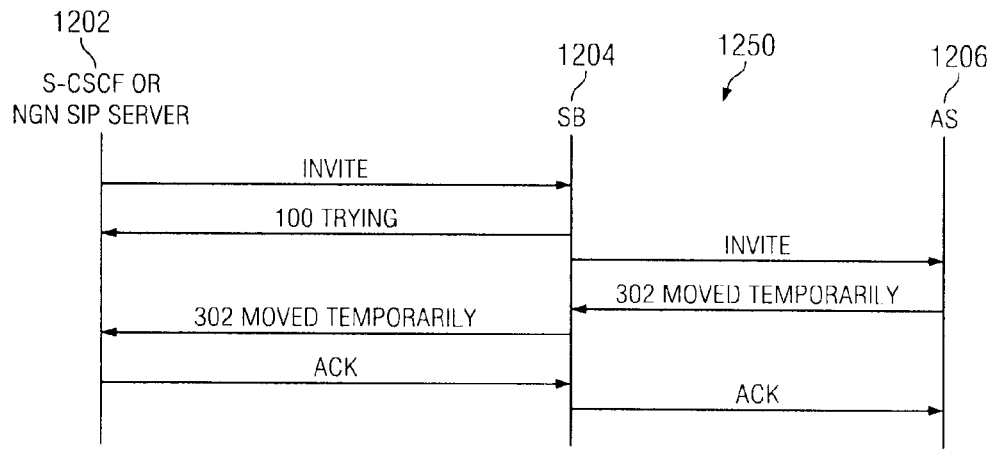
FIG. 12 shows an exemplary message sequence diagram of a SIP to SIP interworking call flow according to various aspects of the present disclosure.

FIG. 12 shows an exemplary message sequence diagram 1250 of a SIP to SIP interworking call flow according to various aspects of the present disclosure. In this example, the Service Broker 1204 maps the incoming SIP Invite from an S-CSCF or NGN SIP Server 1202 into an outgoing SIP Invite, which it sends to an Application server 1206. However, the Service Broker 1204 will perform service determination on the incoming invite to determine the service being invoked and may add the P-Asserted-Service header (which identifies the requested service) to the outgoing SIP Invite. This header may be used by the SIP Application Server 1206 to determine the service to invoke if it is supporting multiple services. The Service Broker 1204 can also remove proprietary headers received in the incoming SIP Invite before sending the SIP Invite to the Application Server 1206.

When a legacy network needs to access a legacy application the communication involves interworking of Intelligent Network signaling with another Intelligent Network signaling. The Service Broker maps individual Intelligent Network messages from the legacy network into the appropriate Intelligent Network protocol message and forwards that message to the SCP. Additionally, the Service Broker maps individual Intelligent Network information elements into the appropriate Intelligent Network information elements carried by the appropriate Intelligent Network protocol message.

Figure 13:
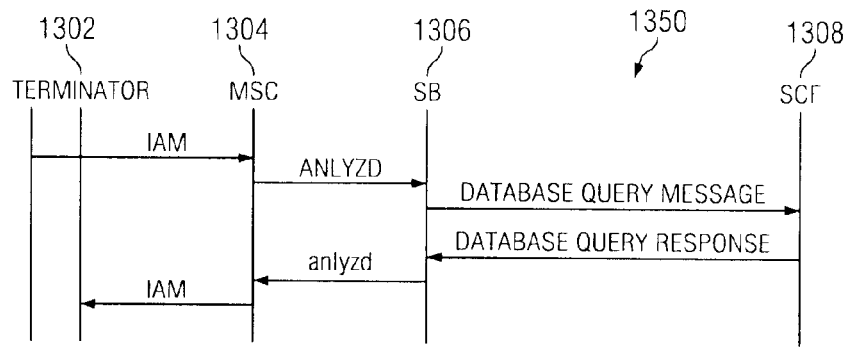
FIG. 13 shows another exemplary message sequence diagram of an Intelligent Network to Intelligent Network interworking call flow according to various aspects of the present disclosure.

FIG. 13 shows another exemplary message sequence diagram 1350 of an Intelligent Network to Intelligent Network interworking call flow according to various aspects of the present disclosure. In this example, the Service Broker 1306 maps the Called Party Number in the Wireless Intelligent Network (WIN) ANLYZD message received from the MSC 1304 to the Called Party Number of the Transaction Capabilities Application Part (TCAP) Database Query Message. This TCAP Database Query Message is sent to an SCF 1308. Other parameters in the WIN ANLYZD message such as the Calling Party Number are also mapped into corresponding fields in the Database Query Message. Some message parameters such as Subsystem Number are populated using Service Broker provisioned data instead of using information or parameters from the ANLYZD message. When the Service Broker 1306 receives the Database Query Response message from the SCF 1308, the Routing Digits and Called Party Number are copied to the Routing Digits and the Billing Digits parameters respectively of the WIN analyzed message sent to the MSC 1304. The MSC 1304, in turn, converts the WIN analyzed message into an Initial Address Message (IAM) that is sent to a Terminator 1302.

When a next generation network needs to access a legacy application the communication involves interworking of SIP signaling with Intelligent Network signaling. The Service Broker maps individual SIP messages from the next generation network into the appropriate Intelligent Network protocol message and forwards that message to the SCP. Additionally, the Service Broker maps individual SIP headers and header parameters into the appropriate Intelligent Network information elements carried by the appropriate Intelligent Network protocol message. If a media path is required for the service then the Service Broker establishes a media leg with the Intelligent Peripheral and provides media conversion from RTP to TDM.

Figure 14:
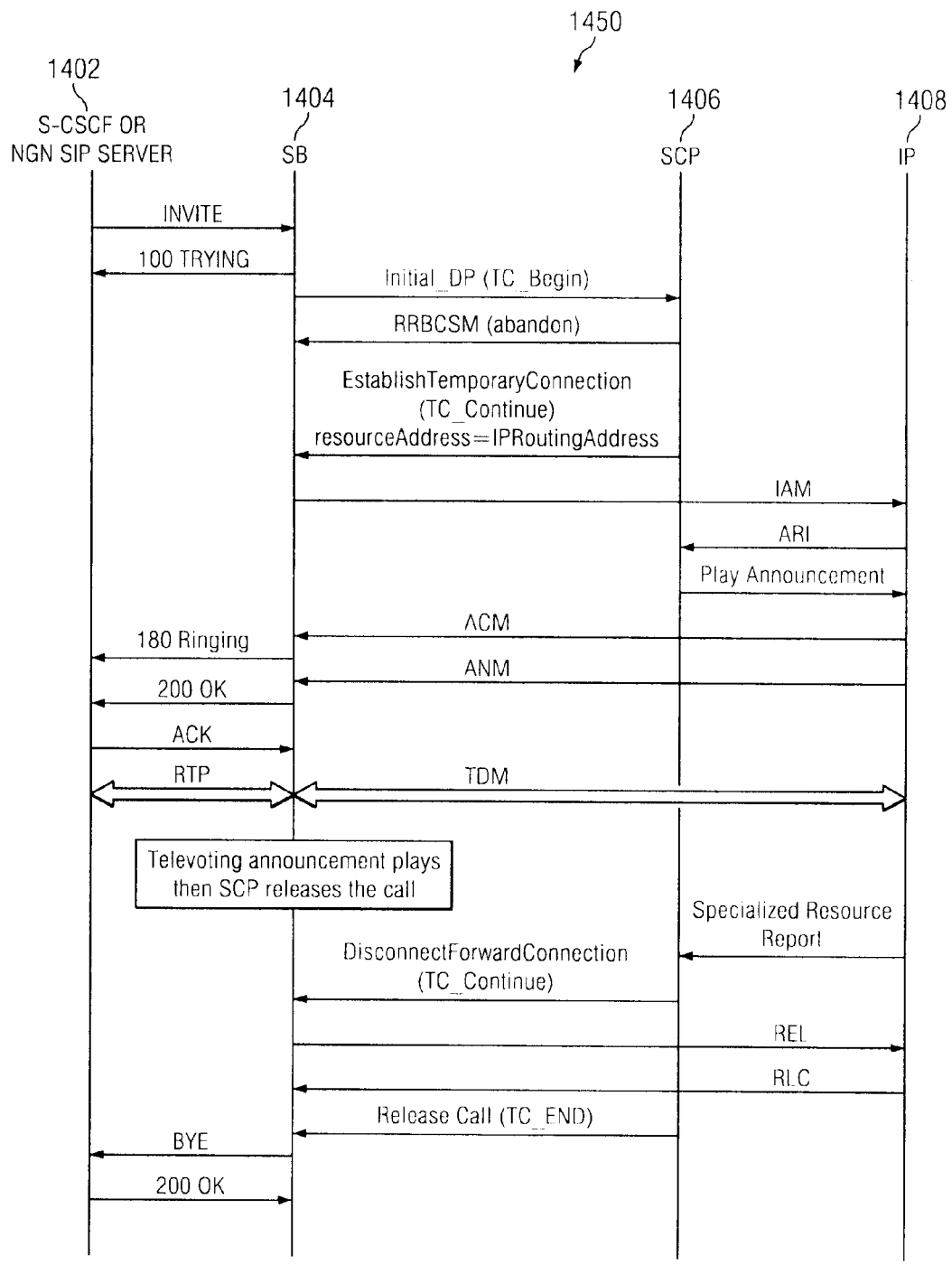
FIG. 14 shows another exemplary message sequence diagram of a SIP to Intelligent Network interworking call flow according to various aspects of the present disclosure.

FIG. 14 shows another exemplary sequence diagram of a SIP to Intelligent Network interworking call flow according to an embodiment of the present disclosure. In this example, the Service Broker 1404 maps the SIP Invite message received from the S-CSCF or NGN SIP Server 1402 into an INAP Initial Detection Point message. The called number in the Request URI of the SIP Invite is mapped into the Called Party Number of the Initial Detection Point message. Other parameters in the SIP Invite such as the Calling Party Number in the From: header or the Bearer Capability from the Session Description Protocol (SDP) portion of the incoming message are also mapped into corresponding fields in the Initial Detection Point message. Some Initial Detection Point message parameters such as the Service Key or Subsystem Number are populated using Service Broker provisioned data instead of using information or parameters from the SIP Invite. For this particular service the SCP 1406 needs to collect additional information from the subscriber so it sends an INAP Establish Temporary Connection (ETC) message to the Service Broker. The Service Broker then launches an SS7 ISUP call to the Intelligent Peripheral (IP) 1408 using the number provided in the Assisting IP Routing Address parameter of the ETC message so that it can collect additional information from the call originator. The Service Broker 1404 maps the SCF Identifier and the Correlation Identifier from the ETC message into the same parameters in the Initial Address Message (IAM). The IP 1408 provides this information to the SCP 1406 so that it can receive instructions from the SCP 1406 for the correct call. The IP 1408 sends an ISUP Address Complete Message (ACM) and then an Answer message to the Service Broker which is mapped into the SIP 180 Ringing and SIP 200 OK messages respectively. When the IP 1408 finishes collecting additional information, it informs the SCP 1406 who in turn informs the Service Broker 1404 with an INAP Disconnect Forward Connection (DFC) message. The Service Broker 1404 maps the DFC into an ISUP Release message and maps the Cause Code parameter from the ETC message into the Cause Code field in the Release message and sends that message to the IP 1408 to disconnect the connection between the Service Broker and the IP. At some point the SCP 1406 decides to end the service and send an INAP Release Call message to the Service Broker 1404. The Service Broker 1404 maps this into a SIP Bye message and sends it to the S-CSCF or NGN SIP Server 1402 to end the call.

When a legacy network needs to access a next generation application the communication involves interworking of Intelligent Network signaling with SIP signaling. The Service Broker maps individual Intelligent Network messages from the legacy network into the appropriate SIP protocol message and forwards that message to the Application Server. Additionally, the Service Broker maps individual Intelligent Network information elements into the appropriate SIP headers and header parameters carried by the appropriate SIP protocol message. If a media path is required for the service then the Service Broker establishes a media leg with the media server and provides media conversion from TDM to RTP.

Figure 15:
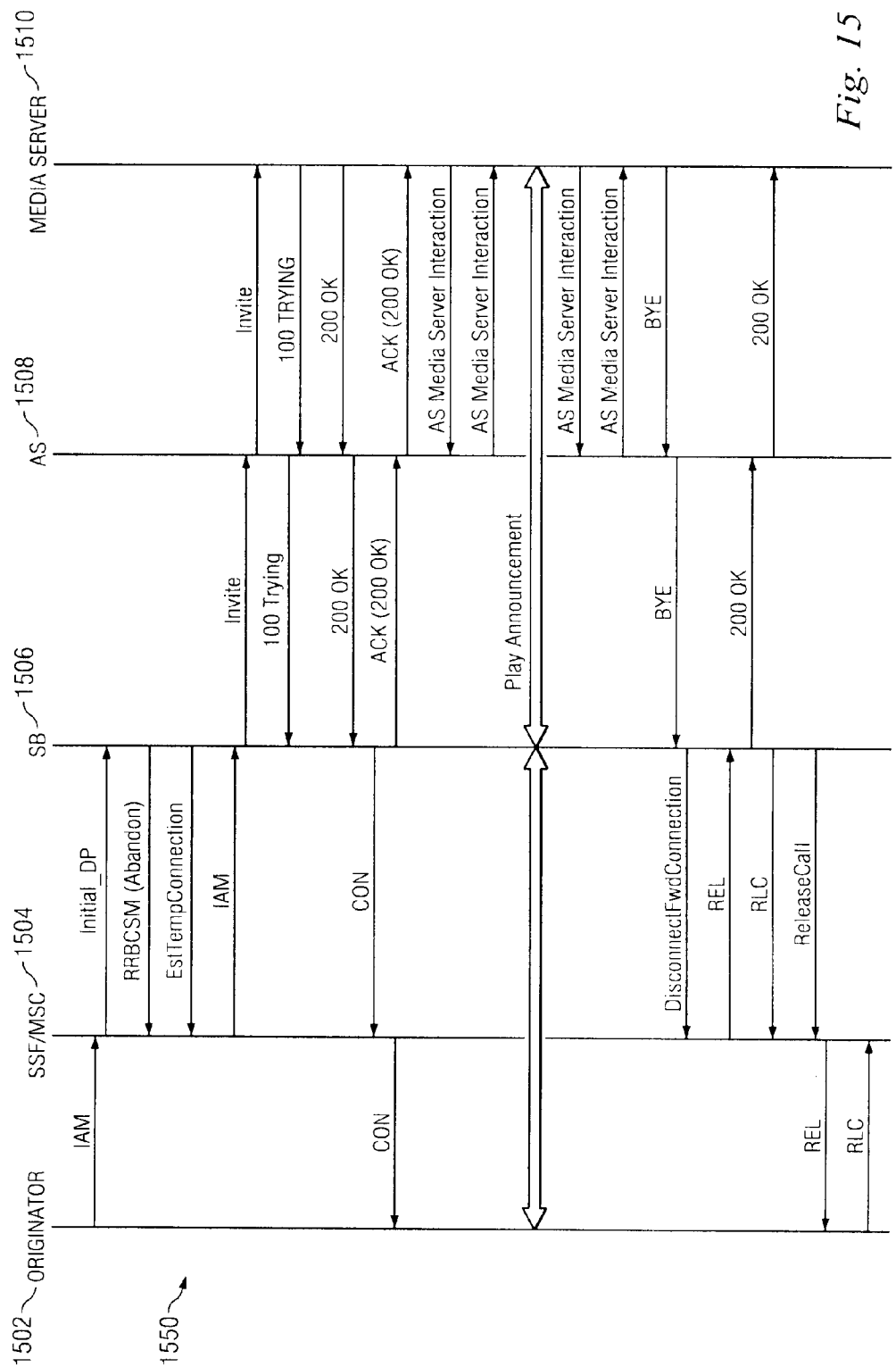
FIG. 15 shows another exemplary message sequence diagram of an Intelligent Network to SIP interworking call flow according to various aspects of the present disclosure.

FIG. 15 shows another exemplary message sequence diagram 1550 of an Intelligent Network to SIP interworking call flow according to various aspects of the present disclosure. In this example, upon receiving the INAP Initial Detection Point message from the SSF/MSC 1504, the Service Broker 1506 performs service determination and determines that this service request requires a media path to be setup between the SSF/MSC 1504 and the Media Server 1510. The Service Broker 1506 immediately sends an INAP Request Report BCSM Event message and an Establish Temporary Connection (ETC) message back to the SSF/MSC 1504. The Service Broker 1506 populates the ETC message with a Temporary Local Directory Number (TLDN), a SCF ID, and a Correlation ID which are used to correlate the return call from the SSF/MSC 1504 to the initial service request. When the SSF/MSC 1504 receives the ETC message it transmits an ISUP Initial Address Message with the correlation information back to the Service Broker 1506 to set up a connection to the Media Server 1510. When the Media Server 1510 answers the call with a SIP 200 OK the Service Broker 1506 maps this message into an ISUP Connect message and transmits it to the SSF/MSC 1504. When the Media Server 1510 finishes collecting information or sending information to the originator it informs the Application Server 1508 by transmitting a SIP Bye message. The Application Server 1508 forwards the SIP Bye message to the Service Broker 1504. The Service Broker 1504 maps the incoming SIP Bye message into an INAP Disconnect Forward Connection (DFC) and transmits the DFC to the SSF/MSC 1504. When the SSF/MSC 1504 receives the DFC it sends a ISUP Release back to the Service Broker 1506 who in turn maps that message in to a SIP 200 OK message for the previously received SIP Bye message and transmits it to the Application Server 1508. The Service Broker 1506 also responds back to the SSF/MSC 1504 with a Release Complete message and then sends an INAP Release Call message to the SSF/MSC 1504 to end the service.

When a next generation network needs to access a next generation application the communication typically involves direct SIP signaling between the two network elements. However, since there are many vendor and country specific variants of SIP emerging; often the next generation network and the next generation application cannot communicate due to SIP protocol incompatibilities. The Service Broker solves this problem by providing the capability to interwork between different variants of SIP signaling. This is accomplished by adding and deleting SIP headers and parameters on each SIP call leg based on provisioning or custom XML scripts invoked for each SIP message that manipulate the headers and parameters.

Figure 16:
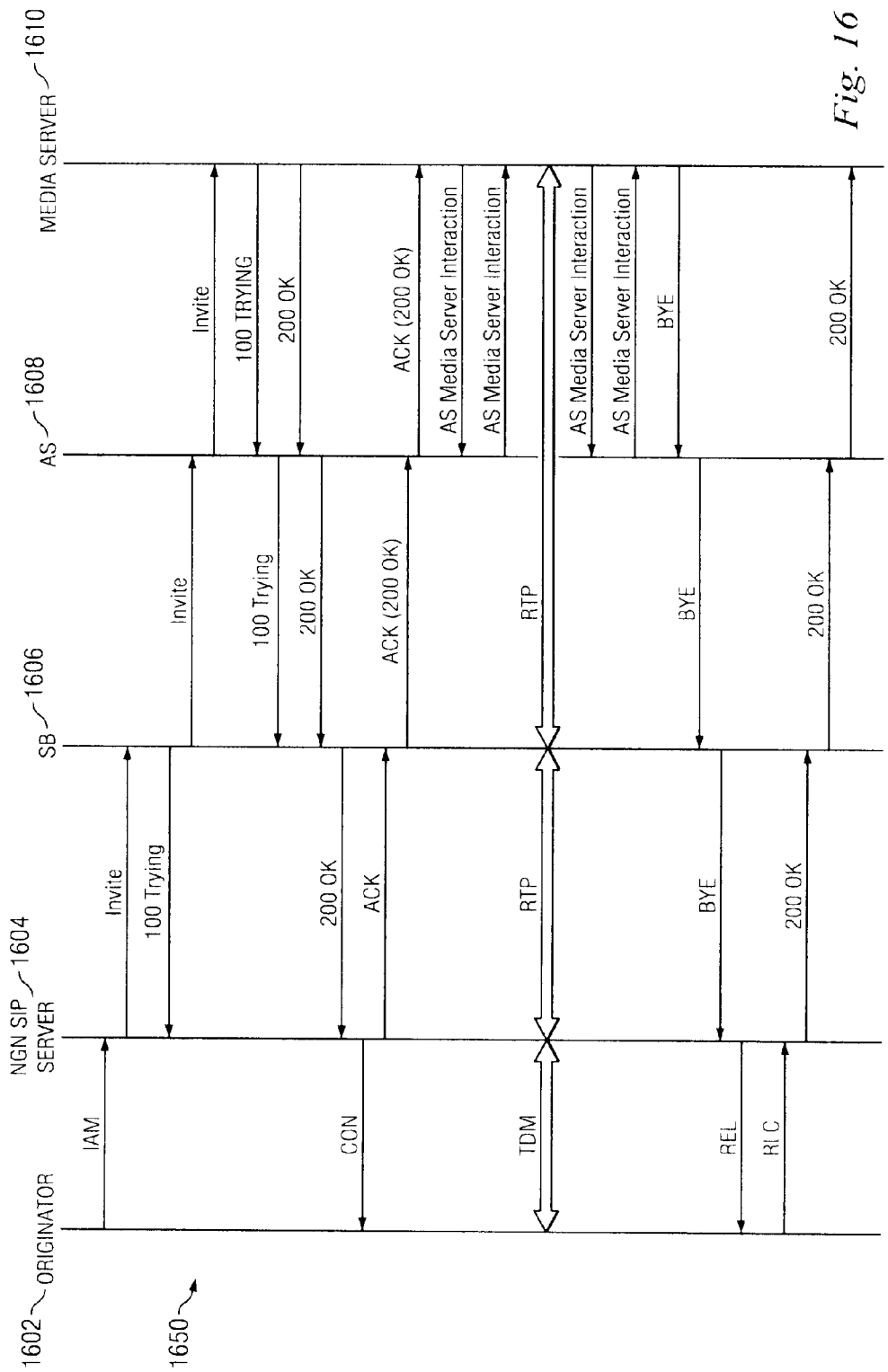
FIG. 16 shows another exemplary message sequence diagram of an Next Generation Network to Next Generation Network interworking call flow according to various aspects of the present disclosure.

FIG. 16 shows another exemplary message sequence diagram 1650 of an Next Generation Network to Next Generation Network interworking call flow according to various aspects of the present disclosure. In this example, the Service Broker 1606 maps the incoming SIP Invite into an outgoing SIP Invite. However, the Service Broker 1606 will perform service determination on the incoming invite to determine the service being invoked and may add the P-Asserted-Service header (which identifies the requested service) to the outgoing SIP Invite. This header may be used by the SIP Application Server 1608 to determine the service to invoke if it is supporting multiple services. The Service Broker 1606 can also remove proprietary headers received in the incoming SIP Invite before sending the SIP Invite to the Application Server 1608.

When a legacy network needs to access a legacy application the communication involves interworking of Intelligent Network signaling with another Intelligent Network signaling. The Service Broker maps individual Intelligent Network messages from the legacy network into the appropriate Intelligent Network protocol message and forwards that message to the SCP. Additionally, the Service Broker maps individual Intelligent Network information elements into the appropriate Intelligent Network information elements carried by the appropriate Intelligent Network protocol message. If a media path is required for the service then the Service Broker establishes a media leg with the Intelligent Peripheral and provides media conversion from TDM to TDM.

Figure 17:
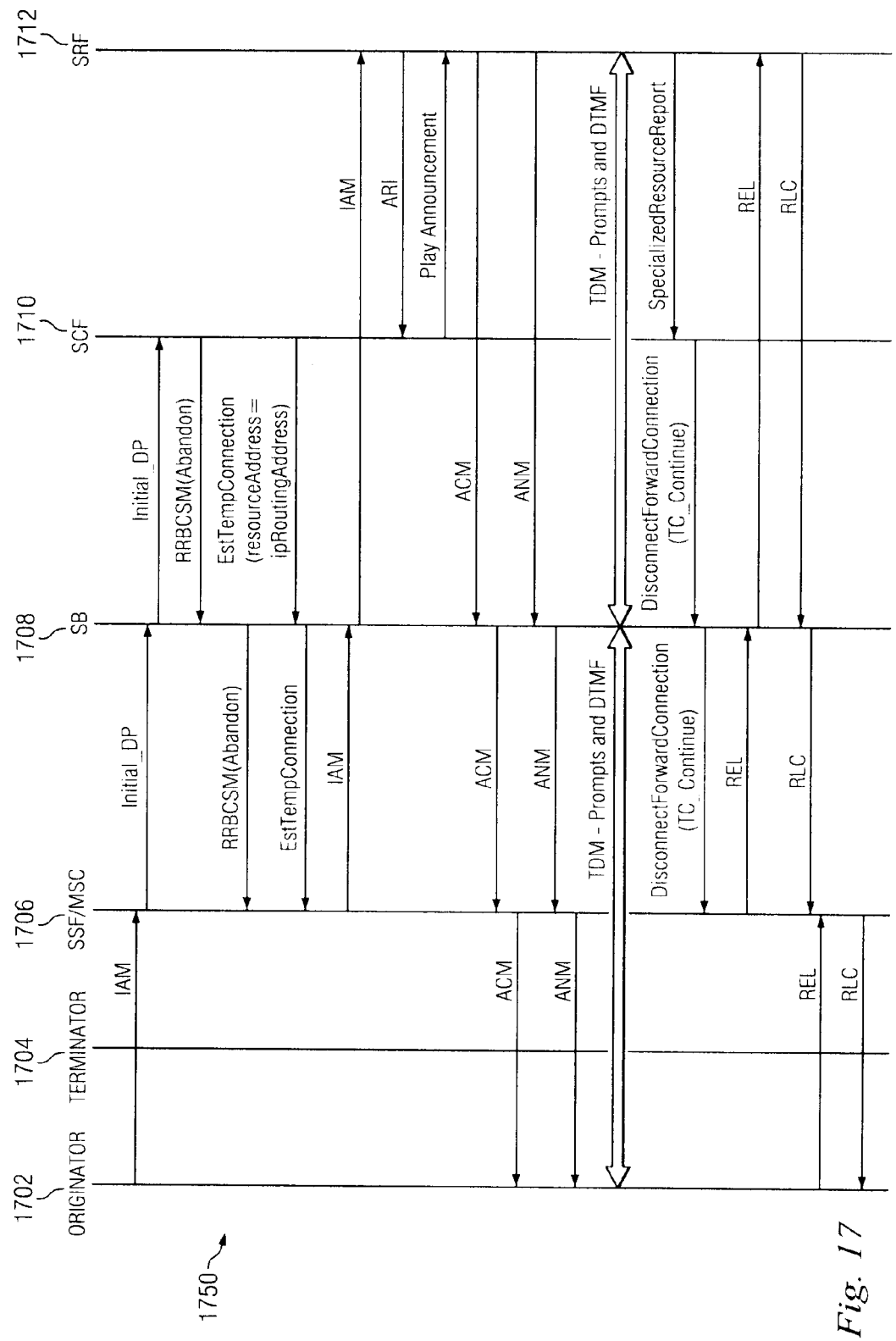
FIG. 17 shows another exemplary message sequence diagram of an Intelligent Network to Intelligent Network interworking call flow according to various aspects of the present disclosure.

FIG. 17 shows another exemplary message sequence diagram 1750 of an Intelligent Network to Intelligent Network interworking call flow according to various aspects of the present disclosure. In this example, upon receiving the INAP Initial Detection Point (IDP) message the Service Broker 1708 converts the IDP message into a CAP based IDP message and forwards it to the SCF 1710. Since INAP and CAP are very similar Intelligent Network standards, mapping of one message type into a different message type is not required in this example. However, mapping of information elements from the incoming IDP to the outgoing IDP is required. The called party number and the calling party number are copied from the incoming IDP to the outgoing IDP. The service key and the subsystem number are set in the outgoing IDP using provisioned Service Broker data. Typically the incoming INAP based IDP is coming from a wireline network so it does not have information elements such as MSC address or VLR number that are wireless network specific. The Service Broker 1708 provides three options for populating the wireless information elements in the CAP IDP; 1) from provisioned data, 2) querying an external database, or 3) hardcoded. Upon receiving the CAP IDP, the SCP immediately sends a CAP Request Report BCSM Event message back to the Service Broker which is forwarded to the SSF/MSC 1706 without modification. The SCF 1710 also sends an Establish Temporary Connection (ETC) message back to the Service Broker 1708 who in turn forwards those messages to the SSF/MSC 1706. The Service Broker 1708 populates the ETC message with a Temporary Local Directory Number (TLDN), a SCF ID, and a Correlation ID which are used to correlate the return call from the SSF/MSC 1706 to the initial service request. When the SSF/MSC 1706 receives the ETC message it transmits an ISUP Initial Address Message (IAM) with the correlation information back to the Service Broker 1708 to set up a connection to the SRF 1712. When the SRF 1712 receives the IAM message it sends an Address Complete Message (ACM) and an Answer (ANS) message back to the Service Broker 1708 which is forwarded to the SSF/MSC 1706 without modification. When the SRF 1712 finishes collecting information or sending information to the originator it informs the SCF 1710 by transmitting a Specialized Resource Report message. The SRF 1712 decides that the service is finished and transmits CAP based Disconnect Forward Connection (DEC) to the Service Broker 1708. The Service Broker 1708 maps the incoming CAP based DFC into an INAP Disconnect Forward Connection (DFC) and transmits the DFC to the SSF/MSC 1706. When the SSF/MSC 1706 receives the DFC it sends an ISUP Release back to the Service Broker 1708 who in turn maps that message into ISUP and sends it to the SRF 1712. The Service Broker 1708 also responds back to the SSF/MSC 1706 with a Release Complete message and then waits for the subscriber to release the call.

Figure 18:
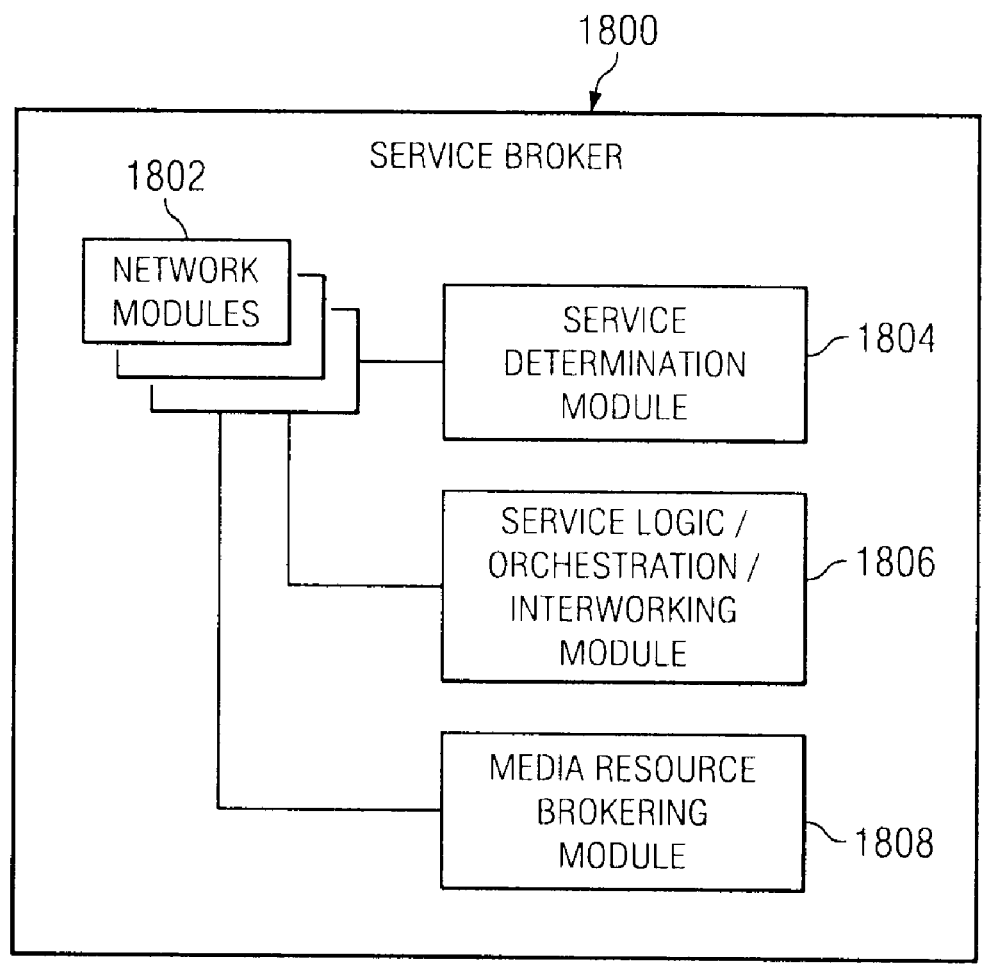
FIG. 18 shows an exemplary Service Broker containing several modules according to various aspects of the present disclosure.

FIG. 18 shows an embodiment of a Service Broker 1800 including several modules according to various aspects of the present disclosure. The Service Broker 1800 includes network modules 1802 (or emulation modules) which are used to communicate with the various legacy and next generation networks between which the Service Broker 1800 provides interoperation. A service determination module 1804 determines which applications or services should be executed for a given request received by one of the network modules 1804. A service logic/orchestration/interworking module 1806 controls the conversion of messages from one network protocol to another in order to allow applications or services on different types of networks to interoperate. A media resource brokering module 1808 (or media resource module) provides access to any media resources required by the various applications serviced by the Service Broker 1800.

The Service Broker can provide multi-application brokering. This capability allows the Service Broker to invoke multiple applications on a single call. For example, in current networks it is not possible to offer Prepaid and Color Ring Back Tone service to a subscriber because both services are invoked by the same service trigger event and the current Intelligent Network standard call model and signaling protocol do not support this scenario. However, a Service Broker inserted into the network between the switching system and the applications provides the capability to invoke both applications using only one trigger event from the network switching system.

The Service Broker can broker between two or more legacy applications, two or more next generation applications, or combinations of legacy and next generation applications. This capability allows service providers to combine or mash-up two or more applications to provide differentiating services to its subscribers regardless of which network the application is currently deployed.

The Service Broker supports multiple methods for invoking multiple applications on a single call. For example, the methods can include, but are not limited to the methods described below:

1) Chaining—this methods invokes two or more applications in a serial manner with the highest priority application being invoked first. All chained applications are notified of a call in a synchronous, serial manner. Once an application has completed processing of a call the next application in the chain is invoked. There are two types of chaining:
    a. Static chaining—the applications to be invoked and the order of invocation is determined by provisioned database information.
    b. Dynamic chaining—the first application to be invoked is determined by provisioned database information but the next application(s) to be invoked is determined by information returned in response messages from the previous application.
2) Broadcasting—All applications in the chain are notified simultaneously of call events. One application is specified as the actor who responds to events. Expected responses for call events coming from non actors are faked back to the non actor application.

Service brokering in the Service Broker is an off-line process in that the call flows of the applications to be interworked are well understood in order to create the orchestration logic using the XML based scripting language. Application combinations are provisioned as a single service code in the network and calls are routed to the Service Broker after it has been determined that a particular application invocation is required. The Service Broker can support the provisioning and configuration of multiple orchestrations for a given set of applications and can apply translation sequences to determine the appropriate orchestration to invoke. Applications are unaware of other applications and are unaware that they are involved in an orchestration. The orchestration determines the sequence of application invocation and is responsible for providing complete message flows for the involved applications. All of the various flavors of multi-application brokering; chaining, broadcasting and concurrent execution are embodied in the orchestration logic described using the XML based scripting.

The Service Broker provides the capability to offer Intelligent Network calls to two or more SCP based applications. This capability allows the service provider to offer two services to a subscriber that utilizes the same Intelligent Network trigger event. For example, prepaid subscribers cannot also subscribe to color ring back tone service because both services are triggered by the same Intelligent Network event.

Many Intelligent Network based services are mutually exclusive because of limitations in the databases and provisioning systems of the network. If two SCP based services require the same trigger from the MSC those two services cannot be offered to the same subscriber simply because they cannot be provisioned. By provisioning a "new" service that is a logical combination of two services and routing that service invocation to a mediation platform, SCP based service combinations can be offered to subscribers. The Service Broker is provisioned to appear as an SCP to existing MSC or SSPs and the SCP(s) are provisioned to the Service Broker as if it was a MSC or SSP. The Service Broker's scripting logic is then used to orchestrate the call flows between the two SCP based services providing the user a unified experience. The Service Broker is also capable of taking a call origination from an NGN network element and providing the interworking necessary to offer SCP based applications to NGN subscribers. In this case, the Service Broker is provisioned to appear as an application server to the NGN network element.

The Service Broker contains embedded service interworking logic for voice applications/services. This capability allows the service provider to connect their networks to the application/service by simply provisioning the associated network, service, and signaling parameters. Custom software changes for the service provider's network or application are rarely needed. The Service Broker provides this capability by embedded service specific finite state machine software that has full knowledge of the underlying message flow required to provide the particular service. Examples of services supported by a Service Broker may include, but not limited to:

1) Freephone
2) Local Number Portability
3) Calling Name
4) Premium Rate
5) Voice Virtual Private Network
6) Televoting
7) Wireless Prepaid
8) Calling Card
9) Color Ring Back Tone
10) Find Me/Follow Me
11) Privacy
12) Network IVR
13) Non-Geographic Numbers
14) Universal Access Number
15) Universal Personal Number
16) Reverse Charging As previously stated, the Service Broker provides encapsulated service interworking logic in the form of state machines. The state machines are developed using a programming language that is based on XML notation and allows the service designer to easily modify the encapsulated service interworking behavior using any XML editor. For example, the service designer can modify the service logic by (1) adding new states that can send and receive standards based protocol messages; (2) adding or deleting optional information elements to standards based messages; and/or (3) adding or deleting proprietary information elements to standards based messages Each service encapsulated within the Service Broker can have all or part of the service interworking logic coded in specific XML files for that service. The service designer can add or modify service interworking logic by editing the XML file. The service designer can code new states, events, and conditions using XML notation that must be met for the underlying service logic to be executed. The Service Broker provides primitives in XML notation that allow the service designer to alter the behavior for the service. Examples of primitives may include, but are not limited to: (1) Set the value of a protocol information element; (2) copy protocol information elements; (3) start and stop protocol timers; (4) send protocol messages for call events; (5) set the values of the call state; (6) register for notification of protocol events; (7) create and connect media call legs; and/or (8) create and destroy application sessions.

The Service Broker XML notation also provides traditional programming constructs in the form of XML elements that allow the service designer to control the execution flow of the service logic.

The Service Broker can support multiple APIs that are used by connected applications to connect to any network supported by the Service Broker. Examples of APIs provided by a Service Broker may include, but are not limited to: (1) C++ API, (2) Web 2.0 API, (3) ccXML API, (4) Parlay X API, and/or (5) Proprietary API The Service Broker maps each of the multiple APIs into an internal common generic protocol used for API execution. This capability allows new APIs to be easily added to the Service Broker without modification of the underlying software platform. The Service Broker also can abstract network signaling protocol messages and information elements into a common protocol and data representation such that the common generic protocol can convey all of the relevant protocol information via the API to the connected application.

Next generation applications often require access and control of media for delivery of the service. For example, a next generation application providing prepaid service may need to warn the prepaid caller of a low balance by playing a warning tone or even a voice based low balance announcement. This can be accomplished by connecting a Media Server port to the caller's media path and playing the tone or announcement.

Traditionally, service providers deploy dedicated Media Servers with each application resulting in underutilized media servers and a higher capital equipment cost to the service provider. The Service Broker provides a capability referred to as Media Resource Broker (MRB) that allows the service provider to centralize media servers and make them available to multiple different applications. The Service Broker provides this capability by, for example, supporting some or all of the capabilities describer herein.

In order for the MRB to effectively manage media resources, the MRB can track each media server's current operational state. For example, the MRB can accomplish this through modeling the media server's loading by analyzing requests made to the media servers.

Media server capacity and capabilities can be provisioned or queried on-line. The units in the following table are dimensionless numbers either supplied by the media server vendor or calculated based on lab measurements and vendor supplied documentation. A sample of the data for an imaginary media server implementation may include, but not limited to the following: (1) Total DSP resources (100000 units), (2) Total CPU (10000 units), and/or (3) Supported Codec list with maximum number of sessions per codec.

Along with this, a table (See Table 1 below) is required for each capability that the media server supports. Table 1, by way of example, documents the cost of that capability in units for each of the monitored resources.

TABLE 1

| Capability | DSP cost in units | CPU cost in units |
| --- | --- | --- |
| G.711 | 1 | 0 |
| G.729 | 10 | 0 |
| H.264 Video Codec | 30 | 0 |
| DTMF Detection | 2 | 0 |
| Silence Suppression | 3 | 0 |
| Echo Cancellation | 2 | 0 |
| Text to Speech | 5 | 5 |
| Voice Recognition | 30 | 10 |
| Conferencing Setup | 2 | 2 |
| Conferencing/Party | 4 | 1 |
| SIP Call Setup/Disconnect | 0 | 3 |
| MSML message | 0 | 2 |
| DTMF Digit Report | 0 | 1 |
| Play Audio/sec | 0 | 3 |
| Record Audio/sec | 0 | 3 |
| H.264 Video Play/sec | 0 | 7 |
| H.264 Video Record/sec | 0 | 7 |

It should be noted that the numbers listed in Table 1 are for exemplary purpose only. In fact, the numbers are highly implementation specific. For example, one may notice that in Table 1 that there are no additional DSP resources required to play a prompt. Instead, there is just the CPU overhead needed to fetch the data and stream it to some internal bus for transcoding, hence the zero in the DSP column. The DSP cost for transcoding is already covered by the cost of the codec used for the call's RTP stream. However, depending upon the implementation, such as in other embodiments, there may be DSP costs associated with playing a prompt. In that case, the DSP entry would not be zero.

Given this summary, the MRB can calculate an estimate of the cost to the media server of a request for an inline, query and/or relay call. It is important to point out that this is only an estimate because the example unit cost in the preceding table may not be exact. The exact DSP costs for a G.729 codec may be well known but the CPU cost for playing an announcement may vary. This data will be provisionable so that it can change based on the Media Servers actually deployed. It will be contained in a Media Server profile that can be different depending on the type of Media Server. Additionally, some run-time adjustments may need to be made, for example the cost of playing an individual announcement may vary significantly based on a number of factors such as the length of the announcement, the protocol for retrieving the media from an external source (HTTP,NFS,FTP,SMB), and other associated factors. Moreover, if the announcement media is cached on the media server the entry in the table is assumed to be an average CPU utilization.

Overload controls on MRB can be implemented using multiple mechanisms that may include, but not limited to:
- a) CPU overload control—The system monitors the overall CPU utilization on the MRB and makes decisions on actions to take when the CPU thresholds are exceeded. Once an MRB CPU is overloaded, the MRB throttles either some or all new requests depending on the overload level. This allows stable calls to continue without degradation of quality. The specific overload levels and actions are user configurable;
- b) Max calls control—The MRB keeps track of the total number of calls for each call type handled by each of the media servers. Once these configured/dynamically calculated thresholds are met, it stops using the affected media server from getting further calls till the situation ceases and the media server has enough free ports/cycles to handle new calls;
- c) Media server utilization controls—The media server resource monitoring algorithms described in the Resource Management section also prevent media server overload; and/or
- d) Licensing controls—The Ignite software platform supports licensed entities. As each licensing limit (for example, BHCA or number of SIP sessions) is hit (high water mark), the MRB prevents the affected call types from progressing. Once the affected licensing limit is within certain thresholds (low water mark), the call types are allowed to progress.

Several load distribution algorithms are supported by the MRB functionality which include, but are not limited to the following:
- a) 'Round-Robin' mode distributes media requests across the pool of available resources;
- b) 'First-Available' prioritizes requests to always search in the same order of resources;
- c) 'Least-Recently-Used' selects the available resource that's been idle the longest time:
- d) 'Most-Recently-Used' selects the available resource that's been idle the shortest time; and/or
- e) 'Most-Available-Capacity' selects the media service with the lowest utilization.

The MRB also provides a mechanism where session usage is tracked against each media server. When traffic levels cause the session usage to reach a provisioned maximum, no more calls will be assigned to that media server until traffic has subsided. A hysteresis algorithm is built in such that the resource's usage has to drop by a certain percentage before new sessions will be assigned to that resource. The MRB also can detect media server availability through a 'heart-beating' mechanism. If a media server becomes unavailable, new resource requests will not be assigned to that media server until operation is restored.

The Service Broker can provide fault and overload detection and recovery of connected media servers. When the Service Broker determines that a media server is in a fault or overload mode the Service Broker no longer offers calls to that media server. When the Service Broker determines that the media server is no longer in fault or overload mode then the Service Broker commences to offer calls to that media server again.

The Service Broker utilizes several methods for determining that that the connected media is in fault or overload mode. For example, the methods utilized by the Service Broker can include, but are not limited to the following:
- a) The SIP Options message is utilized to determine media server operational status. The Service Broker periodically sends the SIP Options heartbeat message to the media server to determine its operational readiness. If the media server does not respond to a SIP Options query then the Service Broker marks that media server as failed and no longer offers it new calls. The heartbeat interval can be configured along with the number of consecutive failed heartbeats before the media server is marked out of service. After detecting a failed media server, the Service Broker continues to send the SIP Options to the media server to determine when it has restored to its operational state;
- b) The Service Broker utilizes the SIP Options message for dynamic media resource availability updates from the media server. The media server resource updates indicate the availability of media resources, processor capacity, processor memory, and any other critical resource. If any resource availability exceeds a predetermined overload threshold (typically 80%) then the Service Broker no longer uses that media server for new calls. When the resource availability drops below a predetermined restore threshold then the Service Broker resumes offering new calls to that media server; and/or
- c) The Service Broker provides fault handling when the media server request is rejected by the originally selected media server due to overload or some other internal fault. For example, if the Service Broker receives a SIP 486 Busy response to the offered SIP Invite, then the call will be offered to another media server for processing. The Service Broker allows the retry count to be provisioned and typically the number of retry attempts will be limited to 2 or 3 media servers before failing the call. The Service Broker continues to offer new calls to the busy media server until it determines that the media server is no longer busy or it determines that the media server has failed using one of the methods described above.

Once the media resource requirements are known, the software can select the appropriate media server to service that request. Many factors can be taken into account to determine the appropriate media server. The factors can include, but are not limited to the following:
- a) The current load on the media server that can support the request based on the resource utilization maps. For example, even though a media server may have plenty of available DSP horsepower it might not be selected because the request might cause the CPU to get overloaded; and/or
- b) Site requirements/network topology, i.e. a particular site might be preferred until the media servers at that site start to get congested then the request could be serviced by a different site.

Moreover, determining the appropriate media server can take the form of a rules-based approach. In general, selecting the appropriate media server may include, but not limited to the following steps:

a) Using the Request Resource Determination algorithms select a list of candidate media servers that can service the request;

b) Apply the media server selection rules to each media server to obtain a preference factor for that media serve; and c) Chose the media server with the highest preference.

Once the call is accepted by a media server its resource utilization map is adjusted by the calculated resource units for that call. The adjusted media server resource utilization map will be used in subsequent selections of the appropriate media server to service a given request.

Throughout the disclosure various next generation network protocols and/or intelligent network/legacy network protocols have been described with respect to the embodiments disclosed herein. It should be noted that the Service Broker can interwork, or map, one or more next generation network signaling protocols such as Session Initiation Protocol (SIP), a SIP variant, H.323, Bearer Independent Call Control (BICC), Media Gateway Control Protocol (MGCP), and Media Gateway Control (Megaco) into one or more Intelligent Network protocols, or legacy network protocols, such as Advanced Intelligent Network (AIN), Intelligent Network Application Part (INAP), Common Alerting Protocol (CAP), Wireless Intelligent Network (WIN), Transaction Capabilities Application Part (TCAP), Mobile Application Part (MAP), and Integrated Serviced Digital Network User Part (ISUP).

Moreover, Service Broker can interwork, or map, one or more Intelligent Network protocols, or legacy network protocols, such as Advanced Intelligent Network (AIN), Intelligent Network Application Part (INAP), Common Alerting Protocol (CAP), Wireless Intelligent Network (WIN), Transaction Capabilities Application Part (TCAP), Mobile Application Part (MAP), and Integrated Serviced Digital Network User Part (ISUP) into one or more next generation network signaling protocols such as Session Initiation Protocol (SIP), a SIP variant, H.323, Bearer Independent Call Control (BICC), Media Gateway Control Protocol (MGCP), and Media Gateway Control (Megaco).

Likewise, the Service Broker can interwork, or map, one or more Intelligent Network protocols, or legacy network protocols, such as Advanced Intelligent Network (AIN), Intelligent Network Application Part (INAP), Common Alerting Protocol (CAP), Wireless Intelligent Network (WIN), Transaction Capabilities Application Part (TCAP), Mobile Application Part (MAP), and Integrated Serviced Digital Network User Part (ISUP) into one or more Intelligent Network protocols, or legacy network protocols, such as Advanced Intelligent Network (AIN), Intelligent Network Application Part (INAP), Common Alerting Protocol (CAP), Wireless Intelligent Network (WIN), Transaction Capabilities Application Part (TCAP), Mobile Application Part (MAP), and Integrated Serviced Digital Network User Part (ISUP)

Similarly, the Service Broker can interwork, or map, one or more next generation network signaling protocols such as Session Initiation Protocol (SIP), a SIP variant, H.323, Bearer Independent Call Control (BICC), Media Gateway Control Protocol (MGCP), and Media Gateway Control (Megaco) into one or more next generation network signaling protocols such as Session Initiation Protocol (SIP), a SIP variant, H.323, Bearer Independent Call Control (BICC), Media Gateway Control Protocol (MGCP), and Media Gateway Control (Megaco).

Aspects of the present disclosure may be implemented in software, hardware, firmware, or a combination thereof The various elements of the system, either individually or in combination, may be implemented in a computer program product tangibly embodied in a machine-readable storage device for execution by a processing unit such as a processor, microcomputer, or digital machine. Various steps of embodiments disclosed herein may be performed by a computer processor executing a program tangibly embodied on a computer-readable medium to perform functions by operating on input and generating output. Additionally, various steps of embodiments of the present disclosure may provide one or more data structures generated, produced, received, or otherwise implemented on a computer-readable medium such as a memory.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. For example, the types of protocols disclosed herein may vary, and different network configurations may be implemented to provide a suitable operating environment of the Service Broker for connecting legacy applications to next generation networks and next generation applications to legacy networks.

The above disclosure provides many different embodiments, or examples, for implementing different features of the invention. Specific examples of components and arrangements are described above to simplify the present disclosure. These are, of course, merely examples and are not intended to be limiting. Accordingly, the components disclosed herein may be arranged, combined, or configured in ways different from the exemplary embodiments shown herein without departing from the scope of the present disclosure.

What is claimed is:

1. A system comprising:

a first network module communicatively coupled to a plurality of first applications associated with a first network utilizing a first network protocol;

a second network module communicatively coupled to a plurality of second applications associated with a second network utilizing a second network protocol, the second network protocol being different than the first network protocol;

a service determination module coupled to the first and second network modules, the service determination module operable to determine at least one application to be executed for a request, wherein the at least one application is selected from a group including the first applications and the second applications, the service determination module determining the at least one application to execute according to a service determination algorithm;

an orchestration module operable to convert at least one first message received by the first network module in the first network protocol into at least one corresponding second message in the second network protocol in order to allow access to the second applications via the first network protocol, the orchestration module operable to convert at least one second message received by the second network module in the second network protocol into at least one corresponding first message in the first network protocol in order to allow access to the first applications via the second network protocol, the orchestration module operable to convert messages according to an orchestration scheme, wherein the orchestration scheme is selected according to the first network protocol of the request and the second protocol of the at least one application; and a media resource brokering module communicatively coupled to the first and second network modules, the media resource brokering module operable to determine from the request whether to send a second request to at least one of a plurality of media components to access at least one of media resources associated with the at least one application, the at least one media component being selected according to a media resource brokering algorithm.

2. The system of claim 1, wherein the first network protocol is a legacy network protocol and the second network protocol is a next generation protocol.

3. The system of claim 1, wherein the at least one application includes a first application and a second application, and wherein the service determination module determines both the first and the second application to execute.

4. The system of claim 1,
wherein the first network protocol is Intelligent Network Application Part (INAP) and the second network protocol is Session Initiation Protocol (SIP),
wherein the request is received from the second network and is an INVITE message that includes at least one of a Distinctive Uniform Resource Identifier (DURI), P-Asserted-Service header, P-Service Indication header, and dialed digits, and
wherein the service determination module determines the at least one application using at least one of the DURI, P-Asserted-Service header, P-Service Indication header, the dialed digits, and a dedicated SIP user agent.

5. The system of claim 1, wherein the first network protocol is Intelligent Network Application Part (INAP) and the second network protocol is Session Initiation Protocol (SIP),
wherein the request is received from the first network and the request is an INAP message that includes one of a subsystem number, service key, and dialed digits,
wherein the service determination module determines the at least one application using one of the subsystem number, service key, and dialed digits.

6. The system of claim 1, further comprising:
an API module operable to receive at least one API request according to an API, the API module operable to convert the API request into an internal common generic protocol for use by the orchestration module to convert the at least one API request into at least one first or at least one second network message.

7. The system of claim 1, wherein the second network protocol is one of Session Initiation Protocol (SIP), a SIP variant, H.323, Bearer Independent Call Control (BICC), and Diameter.

8. The system of claim 1, wherein the first network protocol is one of Advanced Intelligent Network (AIN), Intelligent Network Application Part (INAP), CAMEL Application Protocol (CAP), Wireless Intelligent Network (WIN), Transaction Capabilities Application Part (TCAP), Mobile Application Part (MAP), Integrated Serviced Digital Network User Part (ISUP), and Integrated Services Digital Network/Primary Rate Interface (ISDN/PRI).

9. The system of claim 1, wherein the first network protocol is one wherein the plurality of first applications and the plurality of second applications are selected from the group including Freephone, Local Number Portability, Calling Name, Premium Rate, Voice Virtual Private Network, Televoting, Wireless Prepaid, Calling Card, Color Ring Back Tone, Find Me/Follow Me, Privacy, Network IVR, Non-Geographic Numbers, Universal Access Number, Universal Personal Number, and Reverse Charging.

10. The system of claim 1, wherein the media resource brokering algorithm is one of Round-Robin, First-Available, Least-Recently-Used, Most-Recently-Used, and Most-Available-Capacity.

11. The system of claim 1, wherein the service determination algorithm is one of static chaining, dynamic chaining, and broadcasting.

12. The system of claim 1, wherein the orchestration scheme is defined in an XML-based scripting language.

13. A system comprising:
a first network module communicatively coupled to a plurality of first applications associated with a first network utilizing a first network protocol;
a second network module communicatively coupled to a plurality of second applications associated with a second network utilizing a second network protocol, the second network protocol being different than the first network protocol;
a service determination module coupled to the first and second network modules, the service determination module operable to determine at least one application to be executed for a request, wherein the at least one application is selected from a group including the first applications and the second applications;
an interworking module operable to convert at least one message received by the first network module in the first network protocol into at least one corresponding message in the second network protocol in order to allow access to the second applications via the first network protocol, the interworking module operable to convert at least one message received by the second network module in the second network protocol into at least one corresponding message in the first network protocol in order to allow access to the first applications via the second network protocol; and
a media resource brokering module communicatively coupled to the service determination module, the media resource brokering module operable to determine from the request whether to send a second request to at least one of a plurality of media components to access at least one media resource associated with the at least one application.

14. A method comprising:
receiving at least one first protocol message indicating a communication from a first network;
determining, by examining the at least one first protocol message, a first application to be executed for the communication, the application associated with a second network and a second protocol;
converting the at least one first protocol message into at least one second protocol message;
sending the at least one second protocol message to the first application via the second network;
receiving at least one second protocol response message from the first application via the second network;

determining whether the first application is associated with a media resource;

in response to determining that the first application requires a media resource, sending a request to at least one media component to access the media resource associated with the first application;

converting the at least one second protocol response message into at least one corresponding first protocol response message; and sending the at least one first protocol response message to the first network.

15. The method of claim 14, further comprising:

receiving at least one additional first protocol message related to the communication from the first network;

converting the at least one additional first protocol message into at least one additional second protocol message;

sending the at least one additional second protocol message to the application;

receiving at least one additional second protocol response from the application;

converting the at least one additional second protocol response into at least one first protocol response; and sending the at least one additional first protocol response to the first network.

16. The method of claim 14, wherein the first and second protocols are different, and wherein the first and second networks are different.

17. The method of claim 14, further comprising:

determining a second application to be executed for the communication, the second application associated with a third network and a third protocol.

18. The method of claim 17, further comprising:

receiving media associated with the communication in a first format from the first network;

converting the media in the first format to a second format associated with the at least one media component;

sending the converted media in the second format to the at least one media component;

receiving media associated with the communication from the at least one media component in the second format;

converting the media in the second format to first format; and sending the converted media in the first format to the first network.

19. Apparatus comprising:

a first network module suitable for communicatively coupling to a plurality of services associated with a first network utilizing a first network protocol;

a second network module suitable for communicatively coupling to a plurality of services associated with a second network utilizing a second network protocol, the second network protocol being different than the first network protocol;

a service determination module coupled to the first and second network modules, the service determination module operable to receive a signaling request to access at least one service from one of the first or second network module, wherein the service determination module is operable to determine at least one requested service from the request and send the request to the at least one requested service via one of the first or second network modules; and a media resource module communicatively coupled to the service determination module, the media resource module operable to determine from the request whether to send a second request via one of the first or second network modules to a media component to access media associated with the at least one requested service.

20. A system comprising:

a first network module communicatively coupled to a plurality of services associated with a first network utilizing a first network protocol;

a second network module communicatively coupled to a plurality of services associated with a second network utilizing a second network protocol, the second network protocol being different than the first network protocol;

a service determination module coupled to the first and second network modules, the service determination module operable to receive a signaling request to access at least one service from the plurality of services associated with the first and second networks, wherein the service determination module determines at least one requested service from the request and sends the request to the at least one requested service associated with one of the first and second networks; and a media resource module communicatively coupled to the service determination module, the media resource module operable to determine from the request whether to send a second request to a media component to access media associated with the at least one requested service.

21. The system of claim 20, wherein the first network protocol is Intelligent Network Application Part (INAP) and the second protocol is Session Initiation Protocol (SIP), wherein the request is received from the second network and is an INVITE message that includes at least one of a Distinctive Uniform Resource Identifier (DURI), P-Asserted-Service header, P-Service Indication header, and dialed digits, and wherein the service determination module determines the at least one requested service using one of the DURI, P-Asserted-Service header, P-Service Indication header, the dialed digits, and a dedicated SIP user agent, and wherein sending the request includes sending the request to the at least one requested service that is associated with the first network.

22. The system of claim 20, wherein the first network protocol is Intelligent Network Application Part (INAP) and the second network protocol is Session Initiation Protocol (SIP), wherein the request is received from the first network and the request is an INAP message that includes one of a subsystem number, service key, and dialed digits, wherein the service determination module determines the at least one requested service using one of the subsystem number, service key, and dialed digits, and wherein sending the request includes sending the request to the at least one requested service that is associated with the second network.

23. The system of claim 20, wherein the second network protocol is one of Session Initiation Protocol (SIP), a SIP variant, H.323, Bearer Independent Call Control (BICC), and Diameter, and wherein the first network protocol is one of Advanced Intelligent Network (AIN), Intelligent Network Application Part (INAP), CAMEL Application Protocol (CAP), Wireless Intelligent Network (WIN), Transaction Capabilities Application Part (TCAP), Mobile Application Part (MAP), Integrated Serviced Digital Network User Part (ISUP), and Integrated Services Digital Network/Primary Rate Interface (ISDN/PRI).

24. A system comprising:
a first network module communicatively coupled to a plurality of services associated with a first network utilizing a first protocol;
a second network module communicatively coupled to a plurality of services associated with a second network utilizing a second protocol, the second protocol being different than the first protocol; and
a service determination module coupled to the first and second network modules, the service determination module operable to receive a request from the first network module to access at least one service from the plurality of services associated with the second network, wherein the service determination module determines the at least one requested service from the plurality of services associated with the second network and sends the request to the at least one requested service associated with the second network through the second network module utilizing the second protocol.

25. The system of claim 24, wherein the first network module emulates an Application Server (AS) and the second network module emulates a Service Switching Point (SSP), and
wherein the emulation of the first network module is determined based on the request, and
wherein the emulation of the first network module is determined based on the at least one requested service.

26. The system of claim 24, further comprising:
a media resource module communicatively coupled to the service determination module; and
at least one media component associated with the second network, the media resource module operable to send a second request to the at least one media component in order to access media associated with the at least one requested service,
wherein the first network module emulates an application server and the second network module emulates a service switching point when the request is sent to the at least one requested service associated with the second network and the second network module emulates a service resource function of the second network when the media resource module sends the second request to the at least one media component.

27. The system of claim 24, further comprising:
a media resource module communicatively coupled to the service determination module; and
at least one media component associated with the second network, the media resource module operable to send a second request to the at least one media component in order to access media associated with the at least one requested service,
wherein the first network module emulates a service control point and the second network module emulates one of a Session Initiation Protocol call server, softswitch, or Serving Call Session Control Function when the at least one requested service is associated with the second network and when the media resource module sends the second request to the at least one media component.

28. The system of claim 24, wherein the first network module emulates a Service Control Point and the second network module emulates a Service Switching Point,
wherein the emulation of the first network module is determined based on the request, and
wherein the emulation of the first network module is determined based on the at least one requested service.

29. The system of claim 24, further comprising
a media resource module communicatively coupled to the service determination module; and
at least one media component associated with the second network, the media resource module operable to send a second request to the at least one media component in order to access media associated with the at least one requested service,
wherein the first network module emulates an Application Server and the second network module emulates Serving Call Session Control Function when the at least one requested service is associated with the second network and when the media resource module sends the second request to the at least one media component.

30. The system of claim 24, wherein the first network module emulates a first Application Server and the second network module emulates a second Application Server,
wherein the emulation of the first network module is determined based on the request, and
wherein the emulation of the first network module is determined based on the at least one requested service.

31. The system of claim 24, wherein the first protocol is an intelligent network signaling protocol and the request includes one of a subsystem number, service key, and dialed digits that is used by the service determination module to identify the at least one requested service.

32. The system of claim 24, wherein the service determination module is comprised of a service logic module based on Extensible Markup Language (XML) that is operable to determine the at least one service without programming changes to a resource associated with the first and second networks,
wherein the emulation of the first network module is determined based on the request, and
wherein the emulation of the first network module is determined based on the at least one requested service.

33. A method for use of a service broker positioned between a first network and a second network, the method comprising:
receiving a request from one of the first and second networks requesting at least one service from a plurality of services associated with one of the first and second networks, the first network utilizing a first protocol and the second network utilizing a second protocol that is different from the first protocol;
determining the at least one requested service from the plurality of services based on the request;
sending the request to the at least one requested service; and
determining from the request whether the at least one requested service has associated media and sending a second request to at least one of a plurality of media components associated with one of the first and second networks when the at least one requested service has associated media.

34. The method of claim 33, further comprising:
mapping the request to the second protocol when the request is received from the first network and sent to the at least one requested service associated with the second network; and
mapping the request to the first protocol when the request is received from the first network and sent to the at least one requested service associated with the first network.

35. The method of claim 33, further comprising:
monitoring a characteristic of each of the plurality of media components;

comparing the characteristic of each of the plurality of media components; and sending the second request to at least one media component of the plurality of media components based on the comparison of the characteristic of each of the plurality of media components when the at least one requested service has associated media.

36. The method of claim 35, wherein the characteristic is one of central processor utilization, and digital signal processor utilization, wherein the at least one media component has at least one feature, wherein each feature has a DSP unit cost and a CPU unit cost, and wherein the DSP cost and the CPU cost have a predetermined relationship.

37. The method of claim 33, wherein the first protocol is Intelligent Network Application Part (INAP) and second protocol is a Session Initiation Protocol, wherein receiving the request includes the request being received from the second network and the request is an INVITE message that includes at least one of a Distinctive Uniform Resource Identifier (DURI), P-Asserted-Service header, P-Service Indication header, and dialed digits, wherein determining the at least one requested service from the plurality of services includes using at least one of the Distinctive URI, P-Asserted-Service header, P-Service Indication header, dialed digits, and a dedicated SIP user agent to determine that the at least one requested service is associated with the first network, wherein sending the request includes sending the request to the at least one requested service that is associated with the first network.

38. The method of 37, further comprising:

mapping the INVITE message to INAP prior to sending the request to the at least one requested service associated with the first network.

39. The method of claim 33, wherein the first protocol is Intelligent Network Application Part (INAP) and second protocol is a Session Initiation Protocol, wherein receiving the request includes the request being received from the first network and the request is an INAP message that includes one of a subsystem number, service key, and dialed digits, wherein determining the at least one requested service from the plurality of services includes using one of the subsystem number, service key, and dialed digits to determine that the at least one requested service is associated with the second network, wherein sending the request includes sending the request to the at least one requested service that is associated with the second network.

40. The method of claim 39, further comprising:

mapping the INAP message to Session Initiation Protocol prior to sending the request to the at least one requested service associated with the second network.

41. The method of claim 33, further comprising:

receiving a response to the request from the at least one requested service, wherein the at least one requested service is associated with the second network;

determining whether to send a third request to at least one other requested service associated with the first network based on the response, the at least one other requested service being different than the at least one service; and sending the third request to the at least one other requested service associated with the first network.

42. The method of claim 33, wherein determining the at least one requested service includes determining two or more requested services and sending the request to the at least one requested service includes sending the request to two or more requested services.

43. A computer program product comprising a non-transitory computer-readable storage medium having computer readable instructions stored thereon, the computer readable instructions being executable by a computerized system to cause the computerized system to perform a method for connecting applications to networks, the computerized system, when executing the computer readable instructions, comprising software components including:

a first network module communicatively coupled to a plurality of first applications associated with a first network utilizing a first network protocol;

a second network module communicatively coupled to a plurality of second applications associated with a second network utilizing a second network protocol, the second network protocol being different than the first network protocol;

a service determination module coupled to the first and second network modules, the service determination module operable to determine at least one application to be executed for a request, wherein the at least one application is selected from a group including the first applications and the second applications, the service determination module determining the at least one application to execute according to a service determination algorithm;

an orchestration module operable to convert at least one first message received by the first network module in the first network protocol into at least one corresponding second message in the second network protocol in order to allow access to the second applications via the first network protocol, the orchestration module operable to convert at least one second message received by the second network module in the second network protocol into at least one corresponding first message in the first network protocol in order to allow access to the first applications via the second network protocol, the orchestration module operable to convert messages according to an orchestration scheme, wherein the orchestration scheme is selected according to the first network protocol of the request and the second protocol of the at least one application; and a media resource brokering module communicatively coupled to the first and second network modules, the media resource brokering module operable to determine from the request whether to send a second request to at least one of a plurality of media components to access at least one of media resources associated with the at least one application, the at least one media component being selected according to a media resource brokering algorithm.

* * * * *